United States Patent
Hegarty et al.

(10) Patent No.: US 11,256,480 B1
(45) Date of Patent: Feb. 22, 2022

(54) DESERIALIZATION OF STREAM OBJECTS USING CONSTANT-FOLDABLE METHOD HANDLES

(71) Applicant: Oracle International Corporation, Redwood Shores, CA (US)

(72) Inventors: Chris Hegarty, Dublin (IE); Alexander R. Buckley, Cupertino, CA (US); Julia Katharina Boes, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/171,254

(22) Filed: Feb. 9, 2021

(51) Int. Cl.
*G06F 9/4401* (2018.01)
*G06F 8/30* (2018.01)

(52) U.S. Cl.
CPC ............ *G06F 8/315* (2013.01); *G06F 9/4401* (2013.01)

(58) Field of Classification Search
CPC .................................................... G06F 9/4401
See application file for complete search history.

(56) References Cited

U.S. PATENT DOCUMENTS

| | | | |
|---|---|---|---|
| 4,829,471 A | 5/1989 | Banerjee et al. | |
| 5,161,223 A * | 11/1992 | Abraham | G06F 16/2455 707/718 |
| 5,684,984 A * | 11/1997 | Jones | G06F 16/275 707/613 |
| 6,173,327 B1 * | 1/2001 | De Borst | G06F 9/465 707/999.202 |
| 6,477,701 B1 | 11/2002 | Heistermann et al. | |
| 6,633,888 B1 | 10/2003 | Kobayashi | |
| 10,048,959 B2 | 8/2018 | Sun | |
| 10,713,197 B2 | 7/2020 | Park et al. | |
| 2005/0114871 A1 | 5/2005 | Wolff et al. | |
| 2006/0047685 A1 | 3/2006 | Dearing et al. | |
| 2007/0168949 A1 | 7/2007 | Shattuck et al. | |
| 2008/0163078 A1 | 7/2008 | Van et al. | |
| 2009/0037807 A1 | 2/2009 | Kuznetsov et al. | |
| 2011/0206381 A1 | 8/2011 | Ji et al. | |

(Continued)

OTHER PUBLICATIONS 3.1 The ObjectInputStream Class, in The Java Serialization Specification, available online at < https://docs.oracle.com/en/java/javase/15/docs/specs/records-serialization.html#the-objectinputstream-class >, 46 pages.

(Continued)

*Primary Examiner* — Jae U Jeon
(74) *Attorney, Agent, or Firm* — Invoke

(57) ABSTRACT

A data-instantiator method handle is configured to create a target object based on a stream object. One type of data-instantiator method handles is a Stream Object Processor method handle (SOP_mh). A SOP_mh is a runtime-computed constant in a runtime constant pool. A runtime environment resolves the SOP_mh lazily responsive to a request to access the SOP_mh. The runtime environment invokes the SOP_mh to create a target object based on a stream object. By virtue of being a constant in the runtime constant pool, the SOP_mh is a candidate for optimization by a dynamic compiler in the runtime environment. The dynamic compiler may elect to constant fold the value of the SOP_mh and inline any code or executable logic that the SOP_mh refers to.

21 Claims, 12 Drawing Sheets

(56) References Cited

U.S. PATENT DOCUMENTS

| | | | |
|---|---|---|---|
| 2011/0218981 A1* | 9/2011 | Retnakumari | G06F 9/544 |
| | | | 707/705 |
| 2012/0054452 A1 | 3/2012 | Kumar et al. | |
| 2013/0305012 A1 | 11/2013 | Hopley | |
| 2015/0199080 A1 | 7/2015 | Pletter et al. | |
| 2015/0268878 A1 | 9/2015 | Amit et al. | |
| 2015/0286609 A1 | 10/2015 | Hahn et al. | |
| 2018/0052708 A1* | 2/2018 | Ganesan | G06F 9/4812 |
| 2018/0075107 A1 | 3/2018 | Park et al. | |
| 2019/0215157 A1 | 7/2019 | Guo et al. | |
| 2021/0064380 A1 | 3/2021 | Mai et al. | |

OTHER PUBLICATIONS 4.12.5. Initial Values of Variables, in Chapter 4, Types, Values, and Variables in The Java (Registered) Language Specification Java SE 15 Edition, available online at < https://docs.oracle.com/javase/specs/jls/se15/html/jls-4.html#jls-4.12.5 >, 24 pages.

4.4.10. The CONSTANT_Dynamic_info and CONSTANT_InvokeDynamic_info Structures, in Chapter 4, The class File Format, in The Java (Registered) Virtual Machine Specification Java SE 15 Edition, available online at < https://docs.oracle.com/javase/specs/jvms/se15/html/jvms-4.html#jvms-4.4.10 >, 95 pages.

All together now: A shortcut for @ToString , @EqualsAndHash Code , @Getter on all fields, @Setter on all non-final fields, and @RequiredArgsConstructor, available online at < https://projectlombok.org/features/Data >, 5 pages.

Constructors made to order: Generates constructors that take no arguments, one argument per final / non-null field, or one argument for every field, availavle online at < https://projectlombok.org/features/constructor >, 3 pages.

FlatBuffers White Paper, available online at < https://google.github.io/flatbuffers/flatbuffers_white_paper.html >, 3 pages.

Hegarty et al., "Record Serialization" in Inside Java, available online at < https://inside.java/2020/07/20/record-serialization/ >, Jul. 20, 2020, 6 pages.

Java Object Serialization Specification: 1—System Architecture, available online at < https://docs.oracle.com/en/java/javase/15/docs/specs/serialization/serial-arch.html >, 8 pages.

Java.beans, Class XMLEncoder, available online at < https://docs.oracle.com/javase/7/docs/api/java/beans/XMLEncoder.html >, 6 pages.

JEP 309: Dynamic Class-File Constants, available online at < https://openjdk.java.net/jeps/309 >, 4 pages.

JEP 384: Records (Second Preview), available online at < https://openjdk.java.net/jeps/384 >, (2020), 8 pages.

Rose, "Bytecodes meet Combinators: invokedynamic on the JVM," avaolable online at < https://cr.openjdk.java.net/~jrose/pres/200910-VMIL.pdf >, 11 pages.

Title: A technique for dynamic updating of Java software, author: A Orso,, published on 2002.

Title: Exploiting local similarity for indexing paths in graph-structured data, Author: R Kaushik, published on 2002.

* cited by examiner

DESERIALIZATION OF STREAM OBJECTS USING CONSTANT-FOLDABLE METHOD HANDLES

CROSS-REFERENCE TO RELATED APPLICATIONS

This application is related to U.S. patent application Ser. No. 17/171,327, filed Feb. 9, 2021, U.S. patent application Ser. No. 16/834,139, filed Mar. 30, 2020, and U.S. patent application Ser. No. 16/834,239, filed Mar. 30, 2020; each of which is hereby incorporated by reference.

TECHNICAL FIELD

The present disclosure relates to creating an object in a heap memory based on a byte stream, which may have been previously produced from an object in a heap memory. In particular, the present disclosure relates to deserialization of stream objects using constant-foldable method handles.

BACKGROUND

Source code is written according to a specification directed to the convenience of the programmer. A compiler converts source code to machine or object code, which is executable directly by a particular machine environment. Alternatively, a compiler converts source code to an intermediate representation ("virtual machine code/instructions"), such as bytecode, which is executable by a virtual machine that is capable of running on top of a variety of machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section

BRIEF DESCRIPTION OF THE SEVERAL VIEWS OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one.

To easily identify the discussion of any particular element or act, the most significant digit or digits in a reference number refer to the figure number in which that element is first introduced.

DETAILED DESCRIPTION

Figure 1:
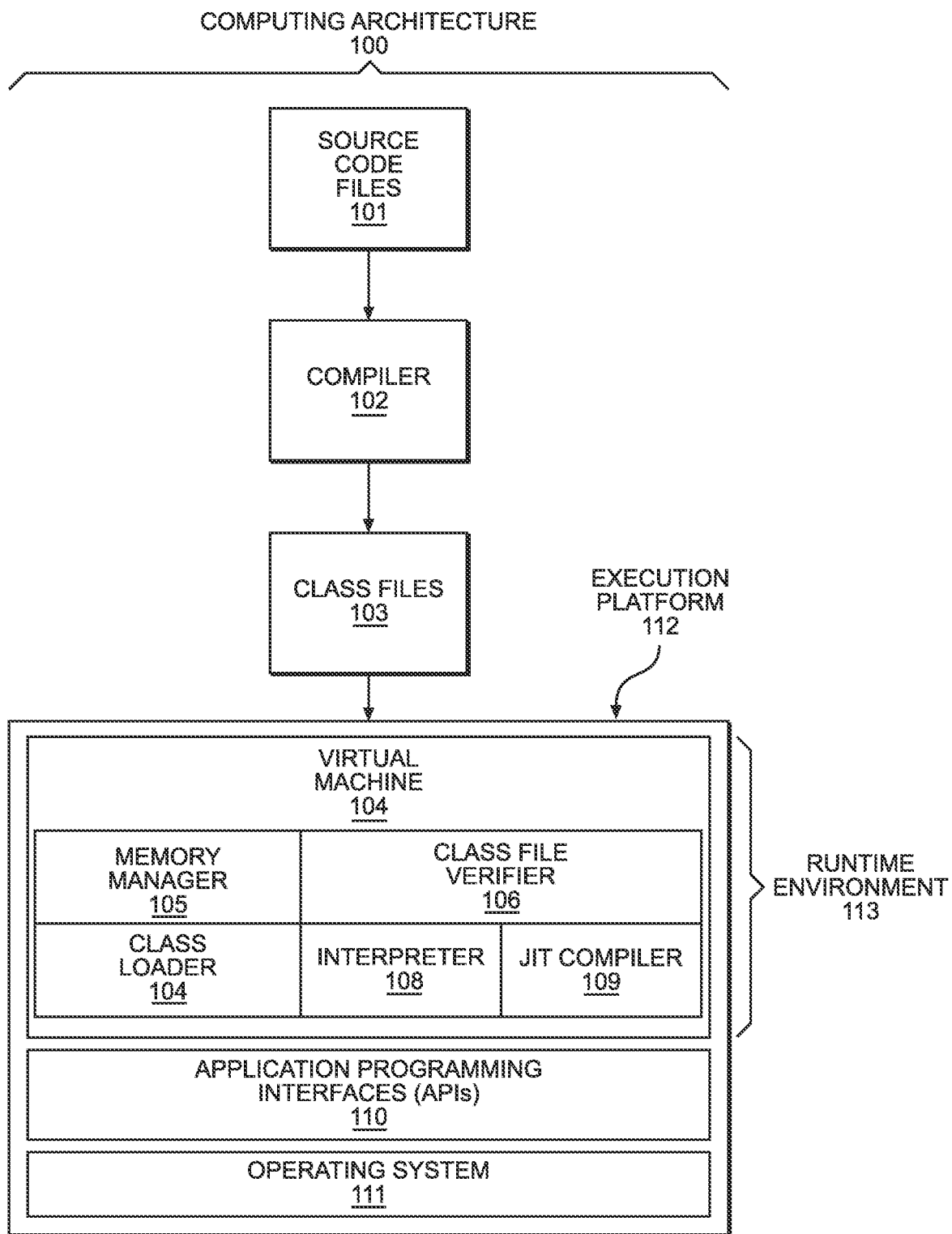
FIG. 1 illustrates an example architecture in which techniques described herein may be practiced according to an embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   a. EXAMPLE CLASS FILE STRUCTURE
   b. EXAMPLE VIRTUAL MACHINE ARCHITECTURE
   c. LOADING, LINKING, AND INITIALIZING
3. STREAM OBJECT PROCESSOR METHOD HANDLE (SOP_MH)
4. INSTANTIATOR ARCHITECTURE
5. COMPILING A CLASS TO SUPPORT CONSTANT-FOLDED DESERIALIZATION
6. CREATING A TARGET OBJECT BASED ON A STREAM OBJECT
7. OBTAINING A CONSTANT SOP_MH FROM A RUNTIME CONSTANT POOL
8. OBTAINING A NON-CONSTANT STREAM OBJECT PROCESSOR METHOD HANDLE (NC_SOP_MH)
9. HARDWARE OVERVIEW
10. MISCELLANEOUS; EXTENSIONS

1. General Overview

Serialization refers to converting an object, within a heap memory, to a byte stream so that the byte stream can be reverted back into a copy of the object. The revertible byte stream may be referred to as a "stream object." A field of the object when referenced in the context of the stream object may be referred to as a "stream field." Deserialization refers to converting such a byte stream into an object in a heap memory. The result of deserialization may be referred to as the "target object." The class of the target object, which is the same as the class of the object converted to a byte stream via serialization, may be referred to as the "target class."

One or more embodiments include creating a target object from a stream object using a constant method handle obtained from a runtime constant pool. A method handle is a strongly-typed reference to an underlying method or constructor, whereby invoking the method handle causes invocation of the underlying method or constructor. A constant method handle always causes invocation of the same underlying method or constructor, and thus may be optimized by the execution environment. The constant method handle to create the target object is adapted, directly or indirectly, from a direct method handle that references a constructor of a target class. A method handle graph illustrates the relationships between the constant method handle, the direct method handle, and zero or more intermediate method handles. The set of method handles, as represented by the method handle graph, matches data values for stream fields to appropriate parameters of the constructor, and finally invokes the constructor to create the target object, that is, an instance of the target class. The constant method handle is also referred to herein as a "Stream Object Processor method handle" (SOP_mh). The SOP_mh is a runtime-computed constant in the runtime constant pool of the target class. On first access of the runtime-computed constant, a bootstrap method is executed to compute the SOP_mh. The SOP_mh is then stored in a heap memory and available for subsequent access through the runtime constant pool.

One or more embodiments include matching data values for stream fields to appropriate parameters of a constructor method of a target class based on a sequence in which the fields of the target class are declared in the target class. The constructor is a canonical constructor whose parameters are the fields of the target class, in the sequence in which the fields are declared in the target class. The offset, within a stream object (or a byte stream derived from the stream object), corresponding to a particular field is determined based on the position of the particular field within the set of fields declared in the target class.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
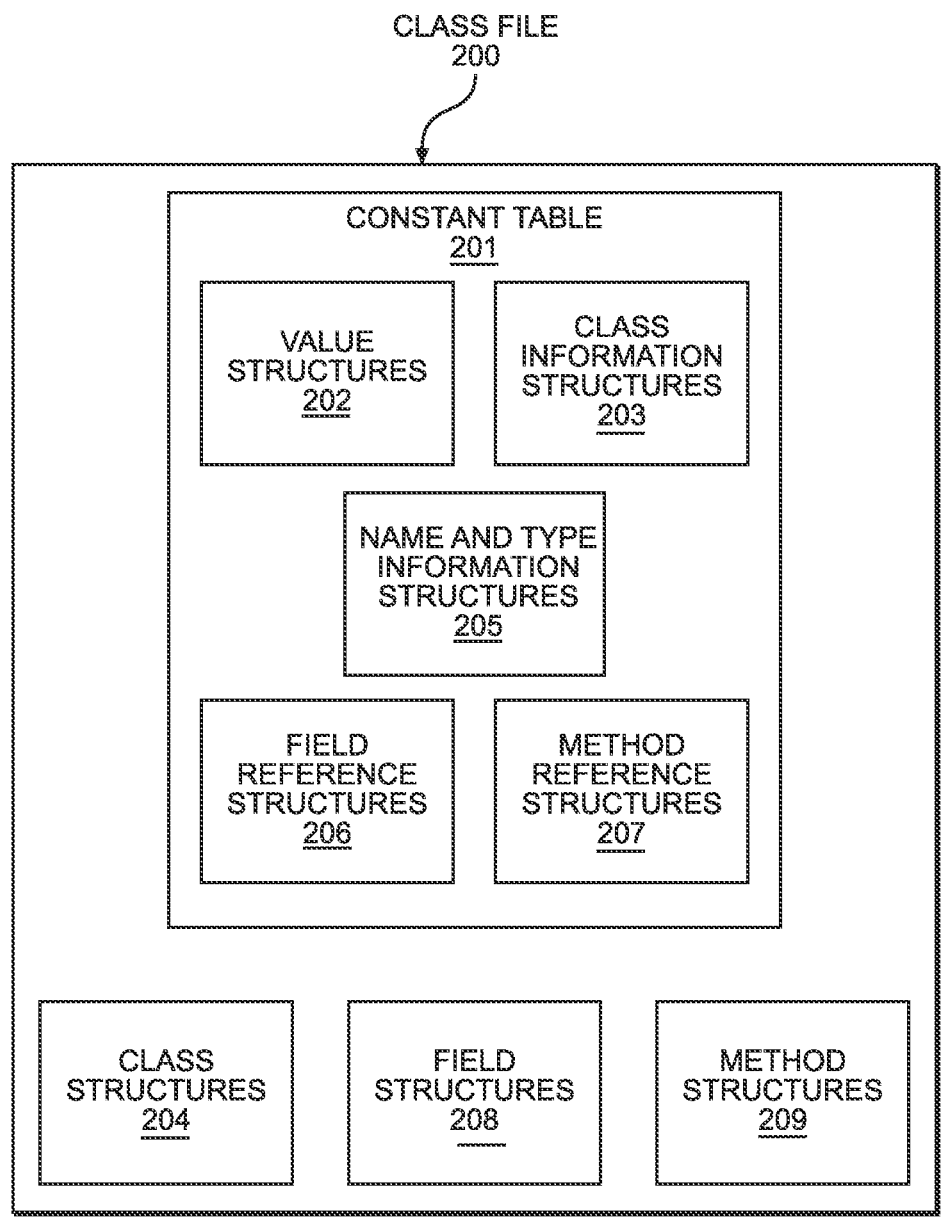
FIG. 2 is a block diagram illustrating one embodiment of a computer system suitable for implementing methods and features described herein according to an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.).

When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

class A
{
int add12and13( ) {
    return B.addTwo(12, 13);
}
}

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
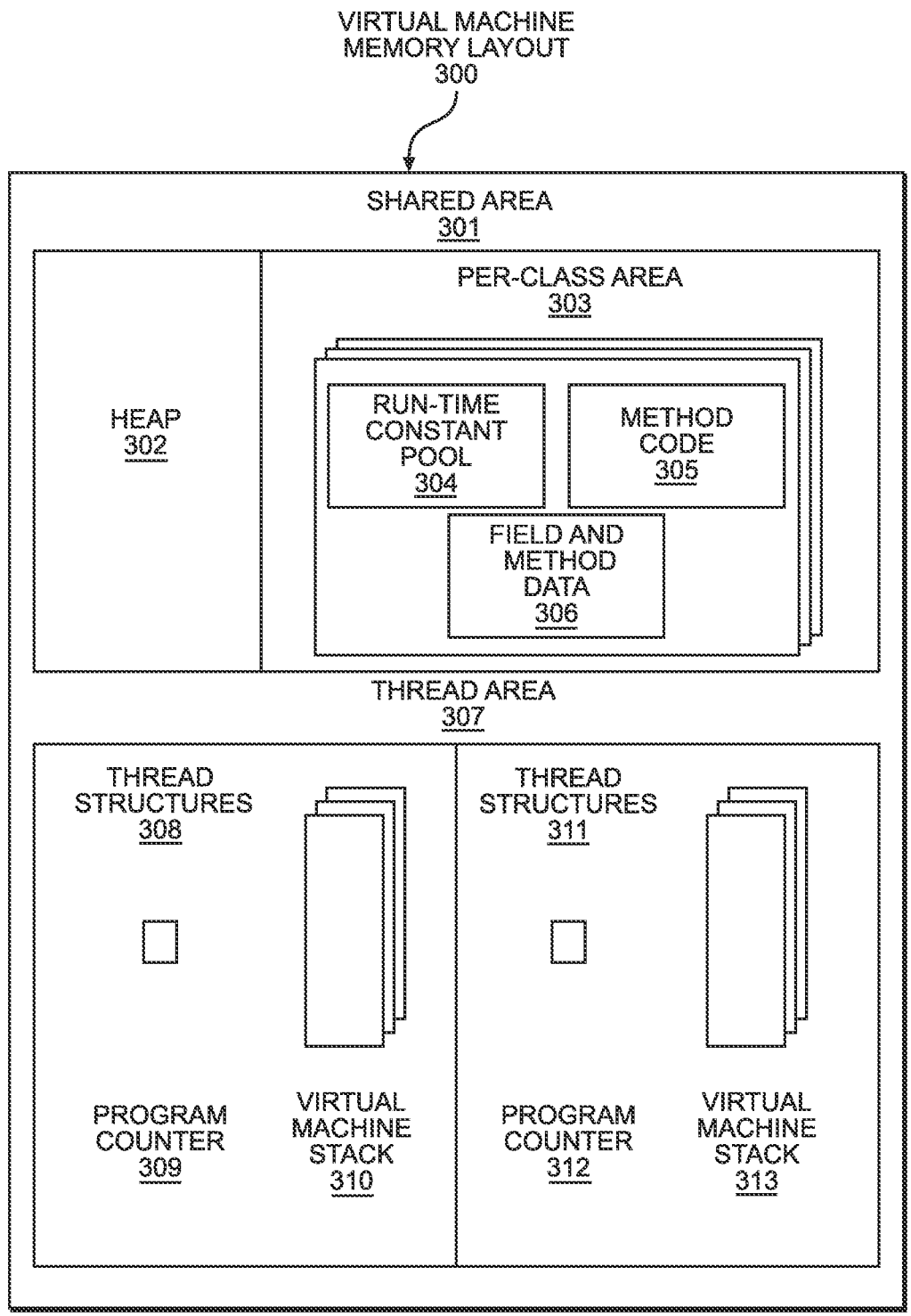
FIG. 3 is a block diagram illustrating an example virtual memory machine layout according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
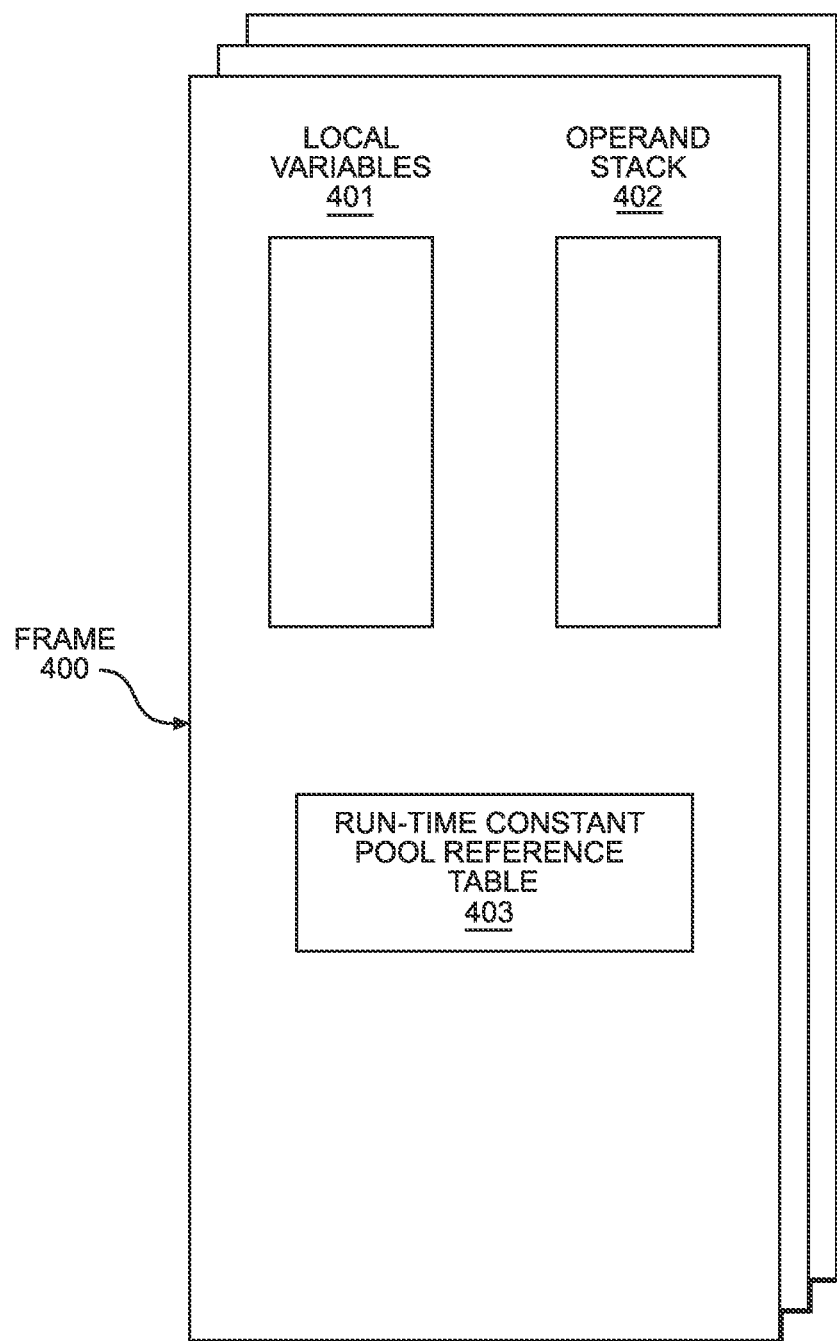
FIG. 4 is a block diagram illustrating an example frame according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Stream Object Processor Method Handle (SOP_mh)

Figure 5:
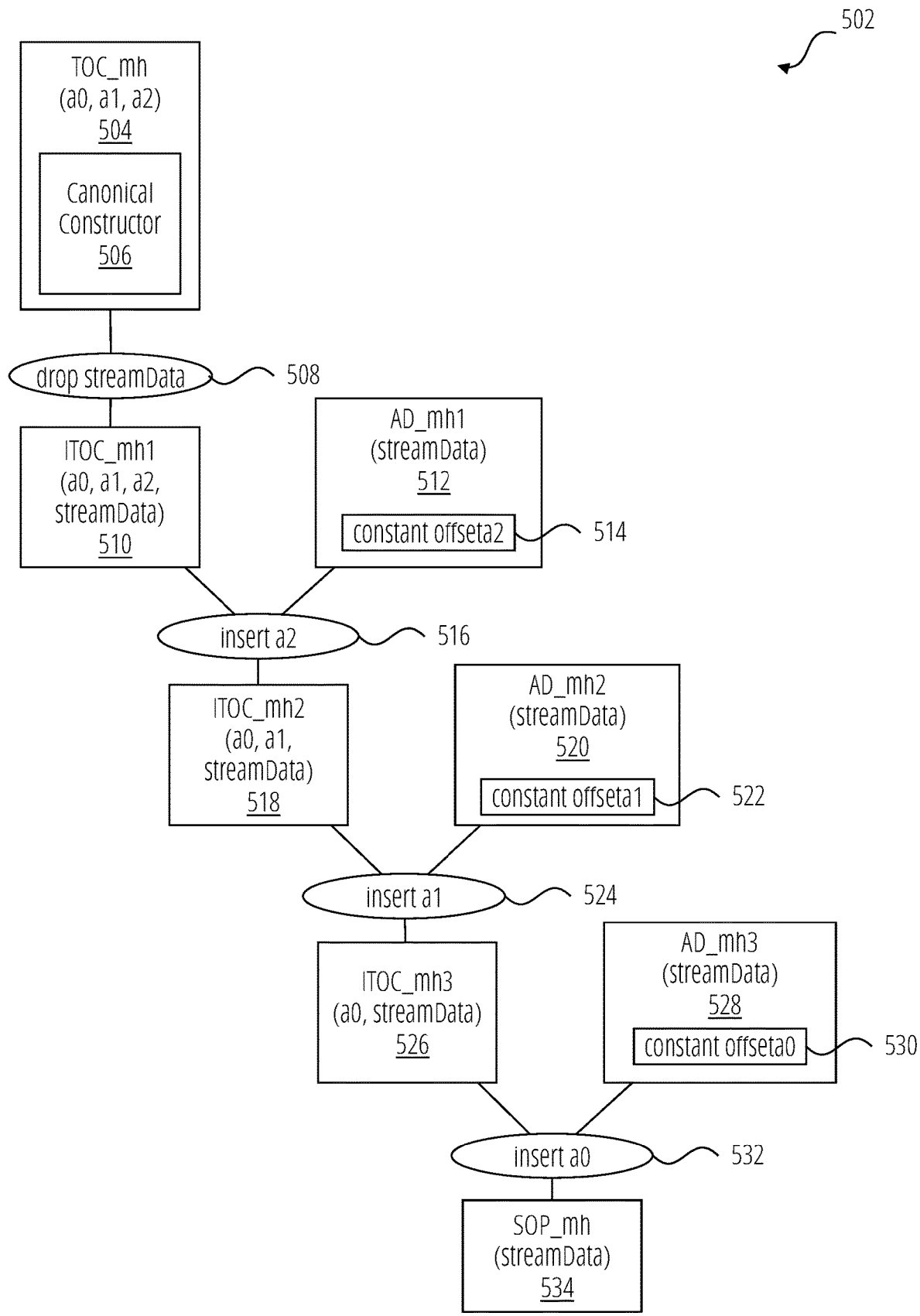
FIG. 5 illustrates an example method handle graph in accordance with one embodiment.

FIG. 5 illustrates an example method handle graph in accordance with one embodiment.

In one or more embodiments, a method handle graph 502 is a tree graph including a root node, leaf node, and zero or more intermediate nodes. As illustrated, a root node represents TOC_mh 504, a leaf node represents SOP_mh 534, and intermediate nodes represent ITOC_mh1 510, ITOC_mh2 518, ITOC_mh3 526.

A method handle represented by a root node in a method handle graph is a "direct method handle," which is a direct reference to a method or constructor of a target class. The direct method handle may also be referred to as a "Target Object Creator method handle." Invoking a direct method handle is equivalent to invoking the method or constructor that the direct method handle refers to. The "method type" of a direct method handle is equivalent to that of the method or constructor that the direct method handle refers to. The term "method type" refers to the arity, order, and types of parameters and return type of a method handle or a method or a constructor.

A method handle mh of type t can be adapted to a new method type t' by creating an adapter method handle mh' that has method type t' and that delegates to the original target of mh. Arguments may be re-arranged, added to, or dropped. Additionally or alternatively, an adapter method handle mh' may insert a value at a specific argument position in the invocation of a method handle mh, where the inserted value is computed by an auxiliary method handle dh that is invoked when mh' is invoked. In such a case, the method type of mh' does not include a parameter representing the inserted value.

Each method handle represented in the method handle graph 502, except for the method handle represented by the root node, is an adaptation of one or more other method handles represented in the method handle graph 502. The method handles represented by the intermediate nodes may be referred to as "Intermediate Target Object Creator method handles." The method handle represented by the leaf node may be referred to as the "Stream Object Processor method handle." Various adapter functions may be used.

As illustrated, a method handle graph 502 shows a set of method handles for creating a target object based on a stream object.

TOC_mh 504 is a direct method handle to a canonical constructor 506 of the target class. The target class declares, for example, three fields in the following sequence: a0, a1, a2. Hence, by definition of canonical constructors, the arguments to the canonical constructor 506 are the same fields in the same sequence: a0, a1, a2. Hence, by definition of a direct method handle, the arguments to TOC_mh 504 are the same fields in the same sequence: a0, a1, a2.

An adapter function drop 508 is used. The adapter function drop 508 takes a method handle mh with N parameters and produces a method handle mh' with N+1 parameters. When mh' is invoked, mh' will discard its N'th argument before calling the underlying method handle mh.

As illustrated, ITOC_mh1 510 is produced based on drop 508. The arguments to ITOC_mh1 510 are the same as TOC_mh 504, except ITOC_mh1 510 also includes a new argument streamData. StreamData is a data structure that holds one or more values derived from the stream object. In an embodiment, streamData has a single component, storing actual data for all fields of the target class. The number, type, and sequence of stream fields in streamData matches the fields of the target class. Hence, the sequence of stream fields matches the sequence of fields of the target class across all fields. In another embodiment, streamData has two components. One component (referred to as a "primitives component") stores actual data corresponding to only primitive fields of the target class. The number, type, and sequence of stream fields in the primitives component match the primitive fields of the target class. The other component (referred to as a "references component") stores actual data corresponding to only reference fields of the target class. The number, type, and sequence of stream fields in the references component match the reference fields of the target class. Hence, the sequence of stream fields matches the sequence of fields of the target class, separately for each field type (primitive fields and reference fields). In either embodiment, streamData is referred to as having a "natural serialized form" (NSF).

Next, an adapter function insert 516 is used. The adapter function insert 516 takes a method handle mh with N parameters as well as an auxiliary method handle dh. Based on mh and dh, the adapter function insert 516 produces a method handle mh' with N−1 parameters. When mh' is invoked with N−1 arguments, mh' will invoke dh using one or more of the N−1 arguments. Then mh' will call the underlying method handle mh with N arguments, namely the N−1 arguments passed to mh' followed by the newly computed value returned from dh.

As illustrated, ITOC_mh2 518 is produced based on insert 516. AD_mh1 512 (also referred to as an "Argument Discovery method handle") serves as an auxiliary method handle for insert 516. AD_mh1 512 is configured to "discover" the actual data for the field a2 of the target object based on streamData. The argument to AD_mh1 512 is the same as an argument to ITOC_mh2 518, that is streamData. AD_mh1 512 is further associated with a constant offseta2 514, representing the offset within streamData corresponding to the field a2 of the target object. (If streamData includes two components, then constant offseta2 514 represents the offset within either the primitives component or the references component, depending on whether the field a2 is a primitive field or a reference field.) AD_mh1 512 identifies and returns the value stored at the offset within streamData corresponding to the field a2. The return value from AD_mh1 512 is inserted as an argument a2 into ITOC_mh1 510, which is then invoked. Hence, ITOC_mh2 518 may be referred to as an adapter method handle that "inserts" the argument a2. The arguments to ITOC_mh2 518 are the same as ITOC_mh1 510, except that the argument a2 corresponding to the return value of AD_mh1 512 is not present.

The adapter functions insert 524 and insert 532 function similarly. Like AD_mh1 512, AD_mh2 520 and AD_mh3 528 are each auxiliary method handles and may be referred to as "Argument Discovery method handles." Each Argument Discovery method handle is configured to "discover" the actual data for a particular field of the target object based on streamData. Each Argument Discovery method handle has streamData as an argument. Each Argument Discovery method handle is associated with a constant offset corresponding to a particular field that the Argument Discovery method handle is configured to discover. As illustrated, AD_mh2 520 discovers the actual data for the field a1. Hence, AD_mh2 520 is associated with constant offseta1 522, representing the offset within streamData corresponding to the field a1 of the target object. AD_mh3 528 discovers the actual data for the field a0. Hence, AD_mh3 528 is associated with constant offseta0 530, representing the offset within streamData corresponding to the field a0 of the target object.

Hence, based on insert 524, the return value from AD_mh2 520 is inserted as an argument a1 into ITOC_mh2 518. The arguments to ITOC_mh3 526 are the same as ITOC_mh2 518, except that the argument a1 corresponding to the return value of AD_mh2 520 is not present.

Based on insert 532, the return value from AD_mh3 528 is inserted as an argument a0 into ITOC_mh3 526. The arguments to SOP_mh 534 are the same as ITOC_mh3 526, except that the argument a0 corresponding to the return value of AD_mh3 528 is not present. Hence, the parameters of SOP_mh 534 do not include any of the fields of the target object. Rather the parameters of SOP_mh 534 correspond to streamData.

"Direct" adaptation refers to an adapter method handle that is generated based on application of a single adapter function to a target method handle (and zero or more other method handles). "Indirect" adaptation" refers to an adapter method handle that is generated based on iterative applications of multiple adapter functions to respective target method handles. As illustrated, ITOC_mh1 510 may referred to as being adapted "directly" from TOC_mh 504; ITOC_mh2 518 may be referred to as being adapted "directly" from ITOC_mh1 510; ITOC_mh3 526 may be referred to as being adapted "directly" from ITOC_mh2 518; SOP_mh 534 may be referred to as being adapted "directly" from ITOC_mh3 526. Additionally, each of ITOC_mh2 518, ITOC_mh3 526, and SOP_mh 534 may be referred to as being adapted "indirectly" from TOC_mh 504.

The method handle graph 502 thus represents a function from a stream object (represented by streamData) to a target object. When creation of a target object based on a stream object is desired, SOP_mh 534 may be invoked using data values derived from a stream object as arguments. Invocation of SOP_mh 534 in turn invokes each of the method handles in a method handle graph 502 until TOC_mh 504 is reached. Specifically, invocation of SOP_mh 534 with one argument (streamData) results in invocation of ITOC_mh3 526 with two arguments: a0 (computed by invoking AD_mh3 528 with argument streamData) and streamData. The invocation of ITOC_mh3 526 results in invocation of ITOC_mh2 518 with three arguments: a0 (as passed to ITOC_mh3 526), a1 (computed by invoking AD_mh2 520 with argument streamData), and streamData. The invocation of ITOC_mh2 518 results in invocation of ITOC_mh1 510 with four arguments: a0 (as passed to ITOC_mh2 518), a1 (as passed to ITOC_mh2 518), a2 (computed by invoking AD_mh1 512 with argument streamData), and streamData. The invocation of ITOC_mh1 510 results in invocation of TOC_mh 504 with three arguments: a0, a1, and a2 (all as passed to ITOC_mh1 510). The canonical constructor referenced by TOC_mh 504 is hence invoked, with the respective values of the stream fields inserted as the arguments.

In an embodiment, constant offseta0 530, constant offseta1 522, and constant offseta2 514 are determined based on a sequence of the fields as declared in the target class, and the types (and respective memory sizes) of the fields. As an example, a target class may include the fields: int a0, double a1, Point a2. The size of an int may be 4 bytes; the size of a double may be 8 bytes; the size of a reference (for Point a2) may be 4 bytes or 8 bytes, depending on platform. Hence, constant offseta0 530 may be 0, referring to the start of streamData. Constant offseta1 522 may be the size of a0 (4) plus constant offseta0 530, which is 4. Constant offseta2 514 may be the size of a1 (8) plus constant offseta1 522, which is 12. As another example, a target class may include the fields: int a0, Point a1, double a2. StreamData may include a primitives component storing data for primitive fields in the order that the primitive fields are declared. StreamData may also include a references component storing data for reference fields in the order that the reference fields are declared. Hence, constant offseta0 530 may be 0, referring to the start of the primitives component. Constant offseta2 514 may be the size of a0 (4) plus constant offseta0 530, which is 4. Additionally, constant offseta1 522 may be 0, referring to the start of the references component. Computing the offsets corresponding to fields of the target object based on the sequence and memory sizes of the fields as declared in the target class is possible because (1) TOC_mh 504 is a direct method handle to a canonical constructor 506 and (2) streamData conforms with NSF.

Different stream objects associated with the target class may be input to a same SOP_mh 534 to create different target objects of the target class. A single SOP_mh 534 may be used for creating multiple objects of a single target class because the offsets corresponding to the fields are same for each stream object of the same target class. The offset of each stream field is bound into the SOP_mh 534 permanently.

Method handle graph 502 shows an example set of method handles for creating a target object based on a stream object, where the target class includes three fields a0, a1, a2. For creating a different object based on a stream object of a different class including a different number of fields, a different number of adapter functions and auxiliary method handles may be used. Moreover, adapter functions and auxiliary method handles different than those in method handle graph 502 may be used. As an example, an adapter function that simultaneously inserts an argument and drops another argument may be used in place of insert 516 and drop 508.

4. Instantiator Architecture

Figure 6:
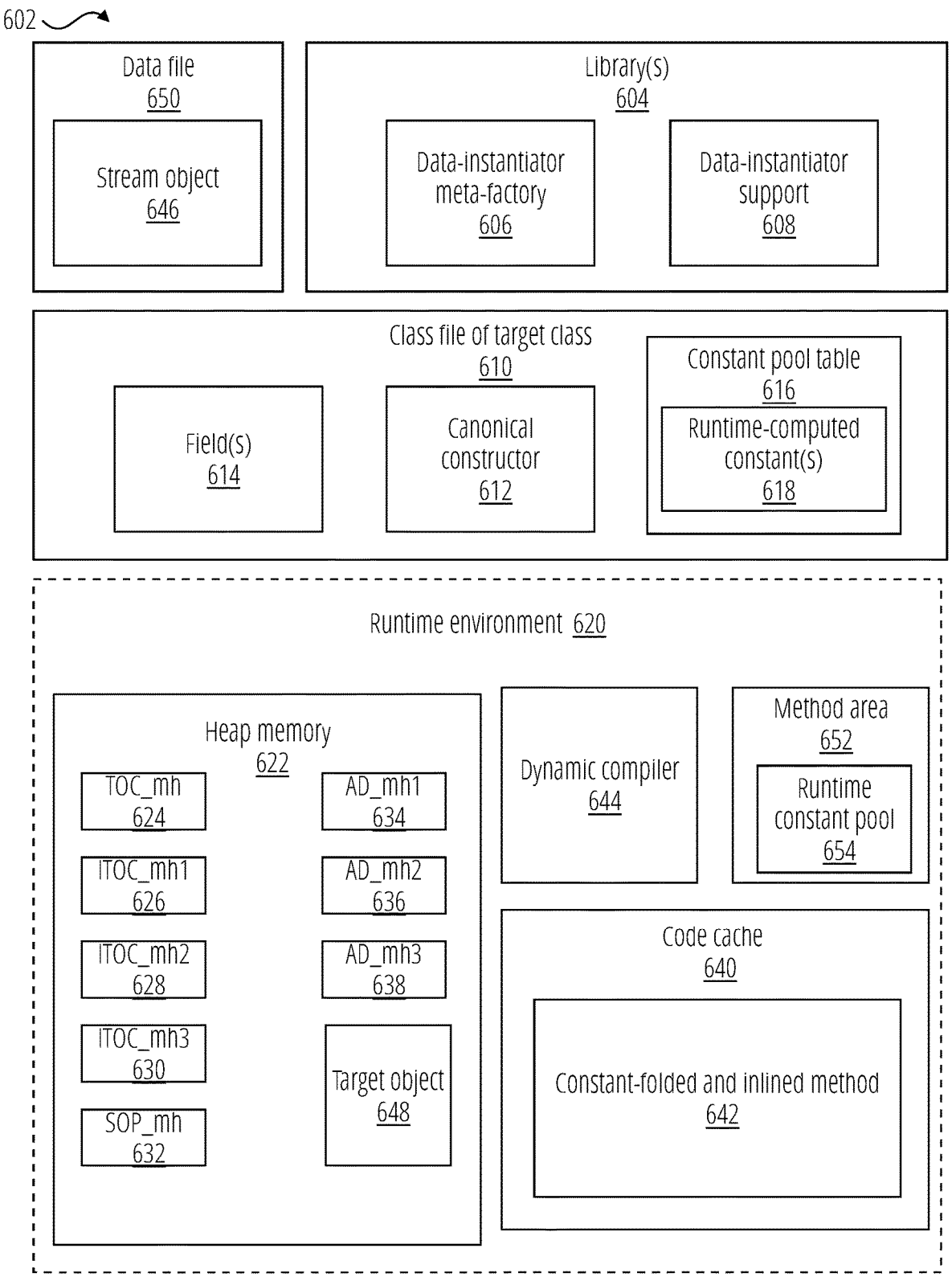
FIG. 6 illustrates an example instantiator architecture in accordance with one embodiment.

FIG. 6 illustrates an example instantiator architecture in accordance with one embodiment. FIG. 6 illustrates a system 602 in accordance with one or more embodiments. As illustrated in FIG. 6, system 602 includes a data file 650, libraries 604, a class file of a target class, a heap memory 622, a dynamic compiler 644, a method area 652, and a code cache 640. In one or more embodiments, the system 602 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, a heap memory 622 represents the run-time data area from which memory for class instances and arrays is allocated. The heap memory 622 refers to data area reserved for allocation to objects created during runtime.

In one or more embodiments, a target object 648 refers to (a) an instance of a class created during runtime of a program and/or application, and/or (b) an object array. A class instance is generated by executing an explicit class instance creation expression. An object array is a container object that holds a fixed number of values of a single type. The object array is a particular set of class instances.

In an embodiment, any object within a heap memory 622 is serializable. In another embodiment, only objects satisfying certain criteria are serializable. Being "serializable" refers to being convertible into a stream object 646. In an example, only objects whose class implements a serialization interface are serializable.

In one or more embodiments, a stream object 646 is a representation of a target object 648 in the form of a byte stream. A byte stream (also referred to as "binary data") is a series of bytes, including 0's and 1's. A stream object 646 is deserializable. Being "deserializable" refers to being convertible into an object within a heap memory 622.

In an embodiment, a stream object 646 conforms with a particular format and/or structure known to a runtime environment 620. As an example, a stream object 646 may begin with an object descriptor or keyword (such as "TC_OBJECT") indicating a start, within a byte stream, of a particular data set corresponding to a target object 648. The stream object 646 may then indicate a class name of a target class of the target object 648, a number of fields within the target class, and the type and name of each field within the target class. The stream object 646 may further include information associated with a parent class, and/or ancestor classes, of the target class. The stream object 646 may further indicate the actual data corresponding to the fields of the target object 648. The stream object 646 may specify the actual data corresponding to the fields in a particular sequence. For example, the sequence of the actual data for the fields in the stream object 646 may follow the same sequence in which the fields are declared in a declaration of the target class. Alternatively, for example, the fields of the target class are separated into two groups: primitives and references. The stream object 646 may first specify the actual data for the primitive fields, and then the actual data for the reference fields. The sequence of the actual data for primitive fields in the stream object 646 may follow the same sequence in which the primitive fields are declared in a declaration of the target class. Separately, the sequence of the actual data for reference fields in the stream object 646 may follow the same sequence in which the reference fields are declared in the declaration of the target class. The portion of the stream object 646 that specifies actual data for a reference field may begin with the same object descriptor (such as "TC_OBJECT") indicating a start, within the byte stream, of a particular data set corresponding to an object. The portion of the stream object 646 that specifies actual data for a reference field may be referred to as an "encapsulated stream object." The encapsulated stream object may follow the same format and/or structure as the original stream object 646 representing the target object 648. The term "stream field" refers to a portion of a stream object 646 corresponding to a particular field of a target class associated with the stream object 646.

In one or more embodiments, a data file 650 is a file specifying one or more stream objects 646 as a byte stream. A data file 650 may conform with a particular format and/or structure known to a runtime environment 620. As an example, a data file 550 may include a header, which may include a keyword indicating the data file 650 includes one or more stream objects 646, and a version number of an associated serialization/deserialization method. The data file 650 may then include one or more stream objects 646, each beginning with an object descriptor (such as "TC_OB-JECT") indicating the start of each data set corresponding to an individual object.

In one or more embodiments, a class file 610 of a target class includes an intermediate representation ("virtual machine code/instructions"), such as bytecode, of the target class. The class file 610 is generated by compiling a source file including source code specifying the target class. The class file 610 is executable by a virtual machine.

In an embodiment, a class file 610 specifies one or more fields 614, a canonical constructor 612, and one or more runtime-computed constants 618.

In an embodiment, a field 614 is a variable of any type that is declared explicitly in a declaration of a target class. A field 614 may be an instance field, for which every object of the target class has a respective individual value. The following is an example declaration of a class Point:

class Point {
    int x;
    int y;
    }

In the above example, the names of fields 614 of the class Point are x and y. The types of the fields 614 are int and int.

In an embodiment, a canonical constructor 612 is a special type of constructor. A constructor of a target class is a method that, when executed, generates an instance of the target class.

A canonical constructor 612 is a constructor whose parameters are derived, in order, from the sequence of fields 614 of the target class. Namely, each successive parameter corresponds in name and type to each successive field in the target class. Referring to the above example, the declaration of the class Point declares a field x of type int, and then a field y of type int, so the canonical constructor 612 for the class Point has a parameter x of type int, and then a parameter y of type int.

In an embodiment, a canonical constructor 612 is included within a class file 610, regardless of whether the canonical constructor 612 is specified by a corresponding source file of a target class. A compiler generates the canonical constructor 612 when compiling the source file based on the fields 614 as declared within the target class. In an embodiment, a canonical constructor 612 is added within a class file 610 even though not included in a corresponding source file only if the target class is associated with certain attributes. As an example, a target class must be declared as a "record class" in order for the addition of a canonical constructor 612 to a corresponding class file 610 even though not included in a source file. Explicit declaration of a record class in the source file triggers generation of a canonical constructor during compilation. The following is an example declaration of a record class Point:

record Point (int x, int y) {
    }

In the above example, in the declaration of the record class, the name of the record class is followed by a header in round parentheses. The header lists the "record components." The list is also referred to as the "record descriptor."

Responsive to identifying a record class, a compiler generates the following: (a) a private final field for each record component; (b) an appropriately named public accessor method for each record component (for example, a public accessor named "xo" for a record component named "x"); (c) "equals," "hashCode," and "toString" for the record class, based on the record components; and (d) the canonical constructor, with the same parameter list as that of the record descriptor. The parameter names, types, and order of the canonical constructor is identical to that of the record descriptor.

In one or more embodiments, a constant pool table 616 is a data structure which, among other functions, acts as a symbol table for the class. A constant pool table 616 of a target class specifies constant values used by the target class, such as literal numbers, strings, and runtime-computed constants 618.

In one or more embodiments, an entry within a constant pool table 616 for a runtime-computed constant 618 statically specifies an index into a bootstrap method table corresponding to a bootstrap method. The entry also statically specifies the type of the runtime-computed constant 618. Prior to runtime, a runtime-computed constant 618 is in an unresolved state. Resolution of a runtime-computed constant 618 is accomplished by calling a bootstrap method referenced by the index. The bootstrap method is given the static information content of the constant, and produces a value of the constant's statically declared type. The value of the constant is stored in a heap memory 622 and accessible for subsequent use through a runtime constant pool 654.

In one or more embodiments, a bootstrap method table (not illustrated) is a data structure associated with bootstrap methods for resolving runtime-computed constants 618. Like a constant pool table 616, a bootstrap method table is stored within a class file 610 and specific per-class. A bootstrap method table includes one or more entries, each corresponding to one or more runtime-computed constants 618. An entry in the bootstrap method table, for a particular runtime-computed constant 618, includes: (a) a reference to a particular bootstrap method that computes a value for the particular runtime-computed constant 618 during resolution of the runtime-computed constant 618; and (b) one or more arguments to the particular bootstrap method. The particular bootstrap method may be found in a library 604, such as a data-instantiator support 608, which is further discussed below. The arguments to a bootstrap method may further include one or more other runtime-computed constants 618, which would be resolved in a similar fashion.

Various implementations may be used as the bootstrap method that helps during resolution of a runtime-computed constant 618 that is a SOP_mh 632. Example implementations are described below with reference to FIG. 7A and FIG. 7B. In an embodiment, each method handle in a method handle graph that is resolved as part of resolving SOP_mh 632 is stored as an object in a heap memory 622, including a direct method handle TOC_mh 624 to a constructor of a target class, any intermediate method handles ITOC_mh1 626 ITOC_mh2 628. ITOC_mh3 630, SOP_mh 632 itself, and any auxiliary method handles AD_mh1 634, AD_mh2 636, AD_mh3 638. A method handle that is a runtime-computed constant may be referred to as a "constant method handle." Each constant method handle is lazily resolved responsive to a request to access the constant method handle. Each constant method handle is not resolved until access to the constant method handle is requested.

Constant method handles are not resolved during source code compilation, or when loading a class file 610 of a target class during runtime.

In one or more embodiments, a library 604 refers to code that is executable together with one or more target classes. A library 604 may be a part of a software development kit (SDK). In an embodiment, a data-instantiator meta-factory 606 and a data-instantiator support 608 may be within a single library 604 or different libraries 604.

In one or more embodiments, a data-instantiator meta-factory 606 refers to code embodying a main entry point for data instantiation. A data-instantiator meta-factory 606 includes a method for obtaining a Stream Object Processor method handle (SOP_mh 632). A Stream Object Processor method handle may be regarded as a "factory" for creating a target object given a stream object; therefore, any code that produces or otherwise helps to obtain a Stream Object Processor method handle may be regarded as a "meta-factory," since the code is a factory for a method handle that itself serves as a factory.

In particular, a data-instantiator meta-factory 606 includes a method for obtaining a constant SOP_mh 632 from a runtime constant pool 654. If the SOP_mh 632 is not yet generated, the data-instantiator meta-factory 606 accesses a bootstrap method (which may reside in another library 604, data-instantiator support 608) that resolves the SOP_mh 632. If the SOP_mh 632 is already generated, the data-instantiator meta-factory 606 retrieves and returns the SOP_mh 632 from a heap memory 622. Examples of operations for obtaining a SOP_mh 632 are described below with reference to FIG. 10. A SOP_mh 632 is invoked to create a target object 648 based on a stream object 646. Examples of operations for invoking a SOP_mh 632 to create a target object 648 based on a stream object 646 are described below with reference to FIG. 9.

In one or more embodiments, a data-instantiator support 608 refers to code embodying one or more bootstrap methods for resolving a runtime-computed constant 618 that is a SOP_mh 632. A data-instantiator support 608 includes a graph generation bootstrap method for generating and adapting a direct method handle to a canonical constructor 612 in order to generate a SOP_mh 632. A parameter to the graph generation bootstrap method is information identifying a target class of the target object to be created by the SOP_mh 632. In some embodiments, the data-instantiator support 608 may include a separate discoverer generation bootstrap method for generating one or more Argument Discovery method handles. A parameter to the discoverer generation bootstrap method is a constant value representing an offset corresponding to a field of the target class.

In one or more embodiments, a method area 652 (also referred to as a shared area) represents an area in memory where structures shared among the various threads executing on a virtual machine are stored. A method area 652 includes a runtime constant pool 654. In particular, a per-class area, associated with a target class, within a method area 652 stores a runtime constant pool 654 for the target class.

In one or more embodiments, a runtime constant pool 654 is a per-class runtime representation of the constant pool table 616 in a class file 610 of a target class. A runtime constant pool 654 includes several kinds of constants, such as numeric literals known at compile-time, method and field references resolved at runtime, and runtime-computed constants 618 resolved at runtime. One function of a runtime constant pool 654 is to serve as a symbol table. Another function of a runtime constant pool 654 is to store a reference to a resolved runtime-computed constant 618 that is stored in a heap memory 622.

In one or more embodiments, a dynamic compiler 644 is configured to compile an intermediate representation of code (such as bytecode), which is found in a class file 610, into native machine code during runtime. The dynamic compiler 644 may also perform optimization on the code during the compilation process. Optimizations may include inlining and constant folding. Inlining involves replacing an invocation of a method with a method body of the method. Constant folding involves replacing a constant expression with an actual constant value.

In an embodiment, a dynamic compiler 644 recognizes constants of a target class, including runtime-computed constants 618, as optimizable. As described above, SOP_mh 632 is a runtime-computed constant 618 referenced from a runtime constant pool 654. Therefore a dynamic compiler 644 may elect to constant fold the value of SOP_mh 632, and inline any code or executable logic that SOP_mh 632 refers to. Inlined code may include method or constructor bodies associated with any method handles of a method handle graph associated with SOP_mh 534, such as method handles represented by intermediate nodes of the method handle graph (ITOC_mh3 630, ITOC_mh2 628, ITOC_mh1 626), a method handle represented by a root node of the method handle graph (TOC_mh 624), and auxiliary method handles in the method handle graph (AD_mh1 634, AD_mh2 636, AD_mh3 638). Additionally or alternatively, the SOP_mh 534 may be inlined into calling code.

In one or more embodiments, a code cache 640 refers to a memory space for storing native machine code generated by a dynamic compiler 644. After a dynamic compiler 644 compiles and optimizes a SOP_mh 632, a code cache 640 stores the SOP_mh 632 as a constant-folded and inlined method 642. The constant-folded and inlined method 642 has a method body that traverses a method handle graph associated with the SOP_mh 632, starting with SOP_mh 534 and ending with TOC_mh 624.

In one or more embodiments, a virtual machine (not illustrated) is configured to execute a class file 610, together with zero or more libraries 604. A virtual machine is implemented on one or more digital devices. The term "digital device" generally refers to any hardware device that includes a hardware processor. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, any component or information described herein, such as SOP_mh 632, runtime-computed constants 618, and/or a constant-folded and inlined method 642, are stored in one or more same or separate data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a virtual machine executing a class file 610. Alternatively or additionally, a data repository may be implemented or executed on a computing system separate from a virtual machine executing a class file 610. The data repository may be communicatively coupled to the virtual machine via a direct connection or via a network.

Figure 7A:
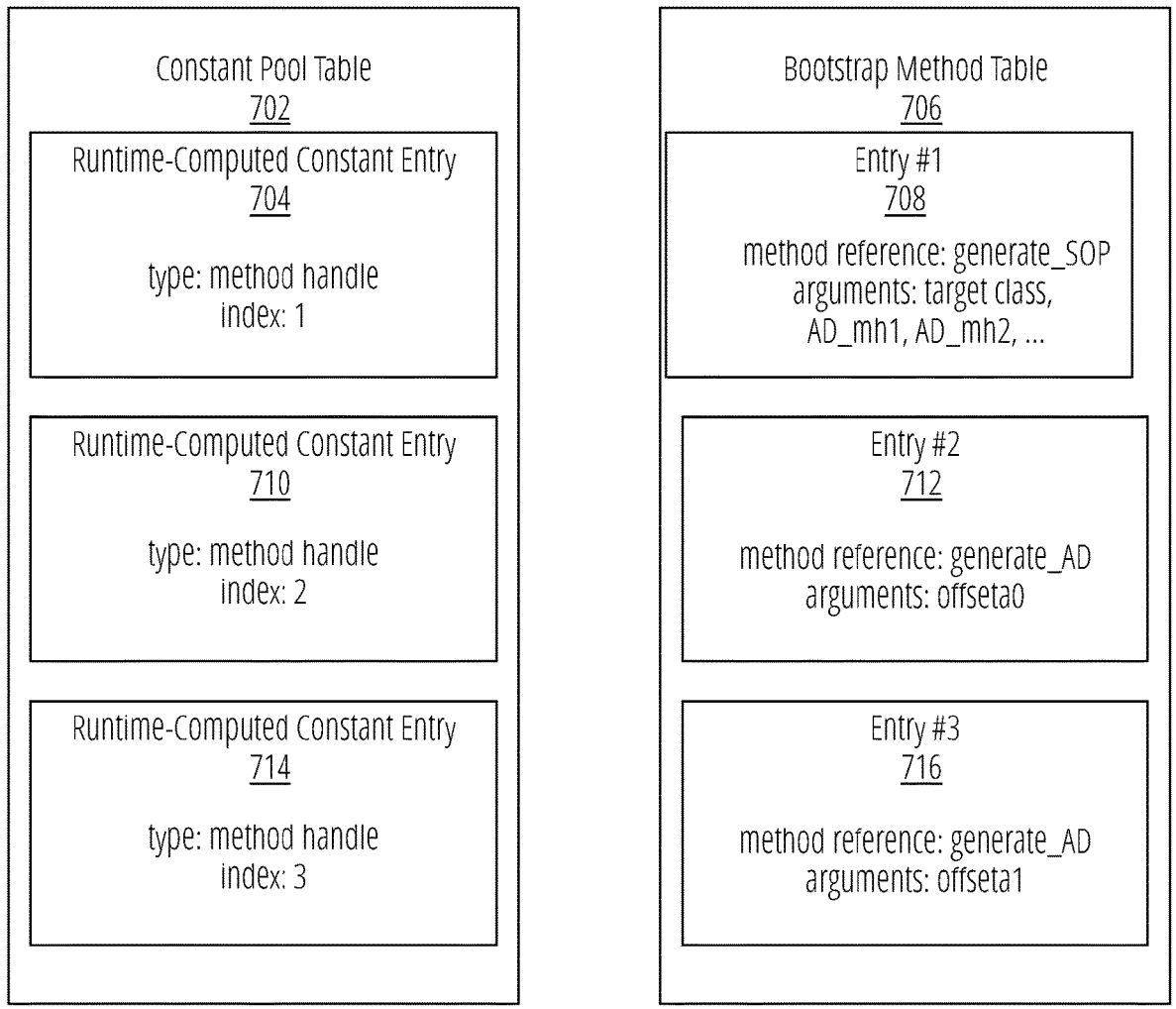
FIG. 7A illustrates an example implementation for resolving a runtime-computed constant that is a SOP_mh in accordance with one embodiment.

FIG. 7A illustrates an example implementation for resolving a runtime-computed constant that is a SOP_mh in accordance with one embodiment.

In an embodiment, a SOP_mh for a target class, and each Argument Discovery method handle such as AD_mh1 and AD_mh2, are stored as separate runtime-computed constants. The SOP_mh corresponds to runtime-computed constant entry 704 in constant pool table 702. Runtime-computed constant entry 704 specifies the type of the runtime-computed constant SOP_mh as "method handle," and the index of the associated entry in bootstrap method table 706 as "1." Now referring to bootstrap method table 706, entry #1 708 includes a method reference to the bootstrap method generate_SOP, which may reside in a library, such as a data-instantiator support library. The return type of the bootstrap method generate_SOP is "method handle," matching the type of the runtime-computed constant in runtime-computed constant entry 704. Entry #1 708 further includes arguments to the bootstrap method. Arguments include an object representing and/or indicating the target class, and one or more runtime-computed constants corresponding to one or more Argument Discovery method handles, such as AD_mh1 and AD_mh2. The number of Argument Discovery method handles is equal to the number of fields of the target class.

Hence, resolving the constant SOP_mh includes resolving one or more constant Argument Discovery method handles. AD_mh1 corresponds to runtime-computed constant entry 710. Runtime-computed constant entry 710 specifies the type of the runtime-computed constant AD_mh1 as "method handle," and the index of the associated entry in bootstrap method table 706 as "2." Now referring to bootstrap method table 706, entry #2 712 includes a method reference to the bootstrap method generate_AD, which may reside in a library, such as a data-instantiator support library. The return type of the bootstrap method generate_AD is "method handle," matching the type of the runtime-computed constant in runtime-computed constant entry 710. Entry #2 712 further includes arguments to the bootstrap method. Arguments include an offseta0 corresponding to a field a0 of the target class. The bootstrap method generates AD_mh1, which is a reference to a method that returns a value at offset0 within a byte stream derived from a stream object.

Similarly, AD_mh2 corresponds to runtime-computed constant entry 714, and thereby entry #3 716. Entry #3 716 includes a method reference to the same bootstrap method generate_AD. However, entry #3 716 includes different arguments for the bootstrap method. Arguments include an offseta1 corresponding to a field a1 of the target class. The bootstrap method generates AD_mh2, which is a reference to a method that returns a value at offset1 within a byte stream derived from a stream object.

After resolution of Argument Discovery method handles AD_mh1 and AD_mh2, the bootstrap method generate_SOP accepts AD_mh1 and AD_mh2 as arguments. The bootstrap method generate_SOP includes code for generating a direct method handle to a constructor of the target class, executing adapter functions using Argument Discovery method handles AD_mh1 and AD_mh2 as auxiliary method handles, and returning the SOP_mh. The SOP_mh is hence adapted indirectly from the direct method handle to the constructor.

Figure 7B:
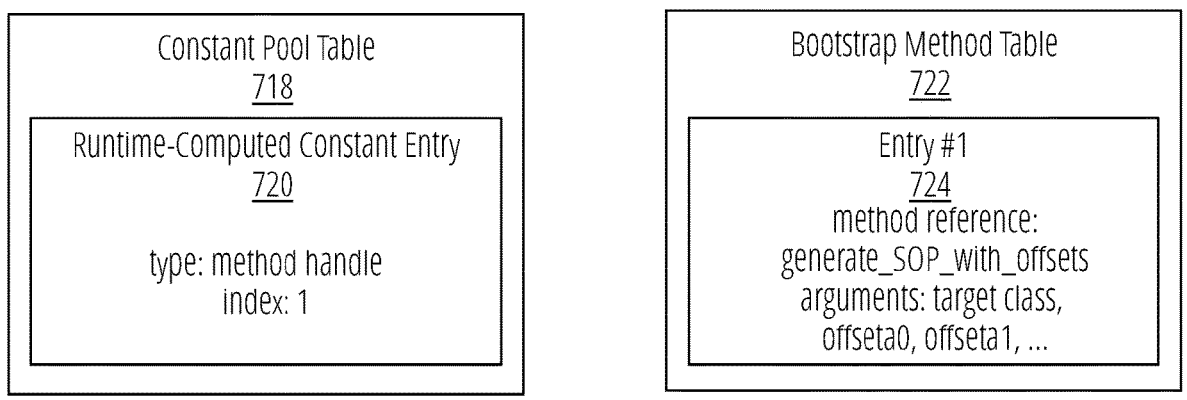
FIG. 7B illustrates another example implementation for resolving a runtime-computed constant that is a SOP_mh in accordance with one embodiment.

FIG. 7B illustrates another example implementation for resolving a runtime-computed constant that is a SOP_mh in accordance with one embodiment.

In an embodiment, a SOP_mh for a target class is a runtime-computed constant. Each Argument Discovery method handle such as AD_mh1 and AD_mh2 is generated within a bootstrap method for resolving the SOP_mh.

The SOP_mh corresponds to runtime-computed constant entry 720 in constant pool table 718. Runtime-computed constant entry 720 specifies the type of the runtime-computed constant SOP_mh as "method handle," and the index of the associated entry in bootstrap method table 722 as "1." Now referring to bootstrap method table 722, entry #1 724 includes a method reference to the bootstrap method generate_SOP_with_offsets, which may reside in a library, such as a data-instantiator support library. The return type of the bootstrap method generate_SOP_with_offsets is "method handle," matching the type of the runtime-computed constant in runtime-computed constant entry 720. Entry #1 724 further includes arguments to the bootstrap method. Arguments include an object representing and/or indicating the target class, and one or more offsets corresponding to fields of the target class. For example, the arguments may include offseta0 and offseta1 corresponding to the fields a0 and a1 respectively.

The bootstrap method generate_SOP_with_offsets accepts offseta0 and offseta1 as arguments. The bootstrap method generate_SOP_with_offsets includes code for generating a direct method handle to a constructor of the target class, generating Argument Discovery method handles AD_mh1 and AD_mh2, executing adapter functions using Argument Discovery method handles AD_mh1 and AD_mh2 as auxiliary method handles, and returning the SOP_mh. Generating AD_mh1 involves generating a reference to a method that returns a value at offset0 within a byte stream derived from a stream object. Generating AD_mh2 involves generating a reference to a method that returns a value at offset1 within a byte stream. The SOP_mh is hence adapted indirectly from the direct method handle to the constructor.

Yet another example implementation (not illustrated) for resolving a runtime-computed constant that is a SOP_mh is similar to FIG. 7B but the arguments listed in entry #1 724 do not include the offsets. The bootstrap method is generate_SOP_from_stream (rather than generate_SOP_with_offsets) and may include code for determining the offsets as part of generating Argument Discovery method handles AD_mh1 and AD_mh2. The offsets are determined based on a sequence of the fields as declared in the target class, and the types (and respective memory sizes) of the fields.

5. Compiling a Class to Support Constant-Folded Deserialization

Figure 8:
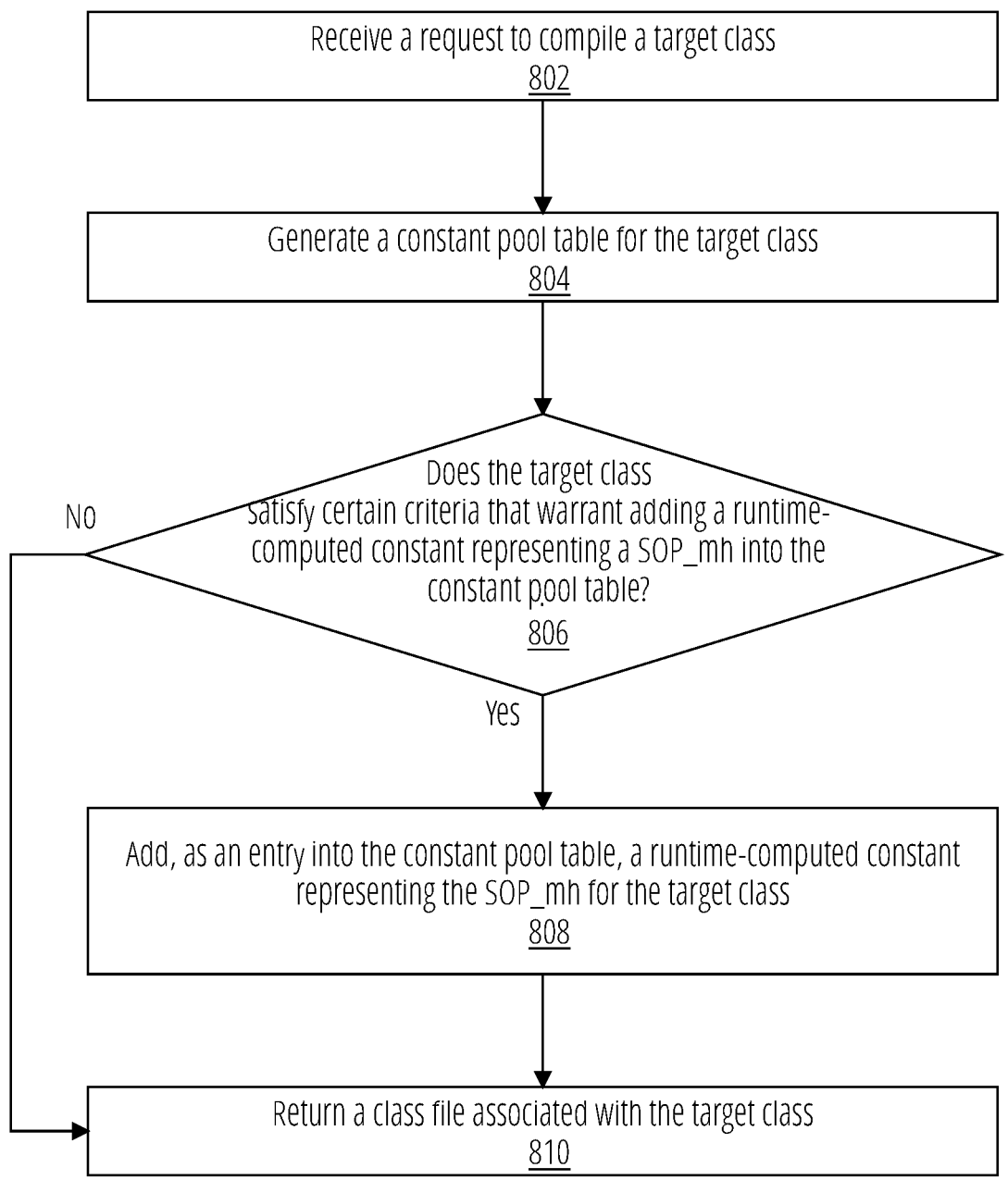
FIG. 8 illustrates an example set of operations for compiling a target class in accordance with one embodiment.

FIG. 8 illustrates an example set of operations for compiling a target class in accordance with one embodiment. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include receiving a request to compile a target class (Operation 802). A compiler receives a request to compile source code of a target class into an intermediate representation such as bytecode.

One or more embodiments include generating a constant pool table for the target class (Operation 804). As part of compiling the target class, the compiler generates a constant pool table for the target class. The compiler analyzes the source code for any constants and stores the constants in a constant pool table.

One or more embodiments include determining whether the target class satisfies certain criteria that warrant adding a runtime-computed constant representing a SOP_mh into the constant pool table (Operation 806). The compiler determines whether the target class satisfies certain criteria that warrant adding a runtime-computed constant representing a SOP_mh (also referred to as a constant SOP_mh) into the constant pool table, even if the constant SOP_mh is not explicitly referenced in the source code.

A criterion warranting addition of the constant SOP_mh to the constant pool table is that the target class has a canonical constructor. The criterion requires that the fields of the target class are the same as the arguments to a constructor of the target class, and the sequence of the fields as declared in a declaration of the target class is the same as a sequence of the corresponding arguments to the constructor.

If the criteria is satisfied, one or more embodiments include adding, as an entry into the constant pool table, a runtime-computed constant representing the SOP_mh for the target class (Operation 808). The compiler adds a constant SOP_mh to the constant pool table, even if the source code does not explicitly declare the constant SOP_mh. Adding the constant SOP_mh includes adding an entry in the constant pool table for a runtime-computed constant that specifies an index into a bootstrap method table, generating the bootstrap method table (if not yet generated), and adding an entry in the bootstrap method table at the specified index that specifies (a) a bootstrap method that is invoked for resolution of the constant SOP_mh and (b) zero or more arguments to the bootstrap method.

In an embodiment, the compiler further adds one or more runtime-computed constants representing Argument Discovery method handles. One constant Argument Discovery method handle is added for each field in the target class. Adding a constant Argument Discovery method handle includes adding an entry in the constant pool table for a runtime-computed constant that specifies an index into a bootstrap method table, and adding an entry in the bootstrap method table at the specified index that specifies (a) a bootstrap method that is invoked for resolution of the constant Argument Discovery method handle and (b) zero or more arguments to the bootstrap method.

In an embodiment, the compiler determines the offsets, within an expected byte stream, corresponding to respective fields of the target class. The compiler determines the offsets based on a sequence of the fields as declared in the target class, and the types (and respective memory sizes) of the fields. The compiler inserts the offsets as arguments to either the bootstrap method for resolving the constant SOP_mh or the bootstrap methods for resolving the Argument Discovery method handles. In another embodiment, a runtime environment determines the offsets during runtime-computed constant resolution, as further described below with reference to Operation 1014.

One or more embodiments include returning a class file associated with the target class (Operation 810). The compiler returns a class file including the intermediate representation of the target class. The class file includes the constant pool table and if necessary the bootstrap method table. The class file is executable by a virtual machine.

6. Creating a Target Object Based on a Stream Object

Figure 9:
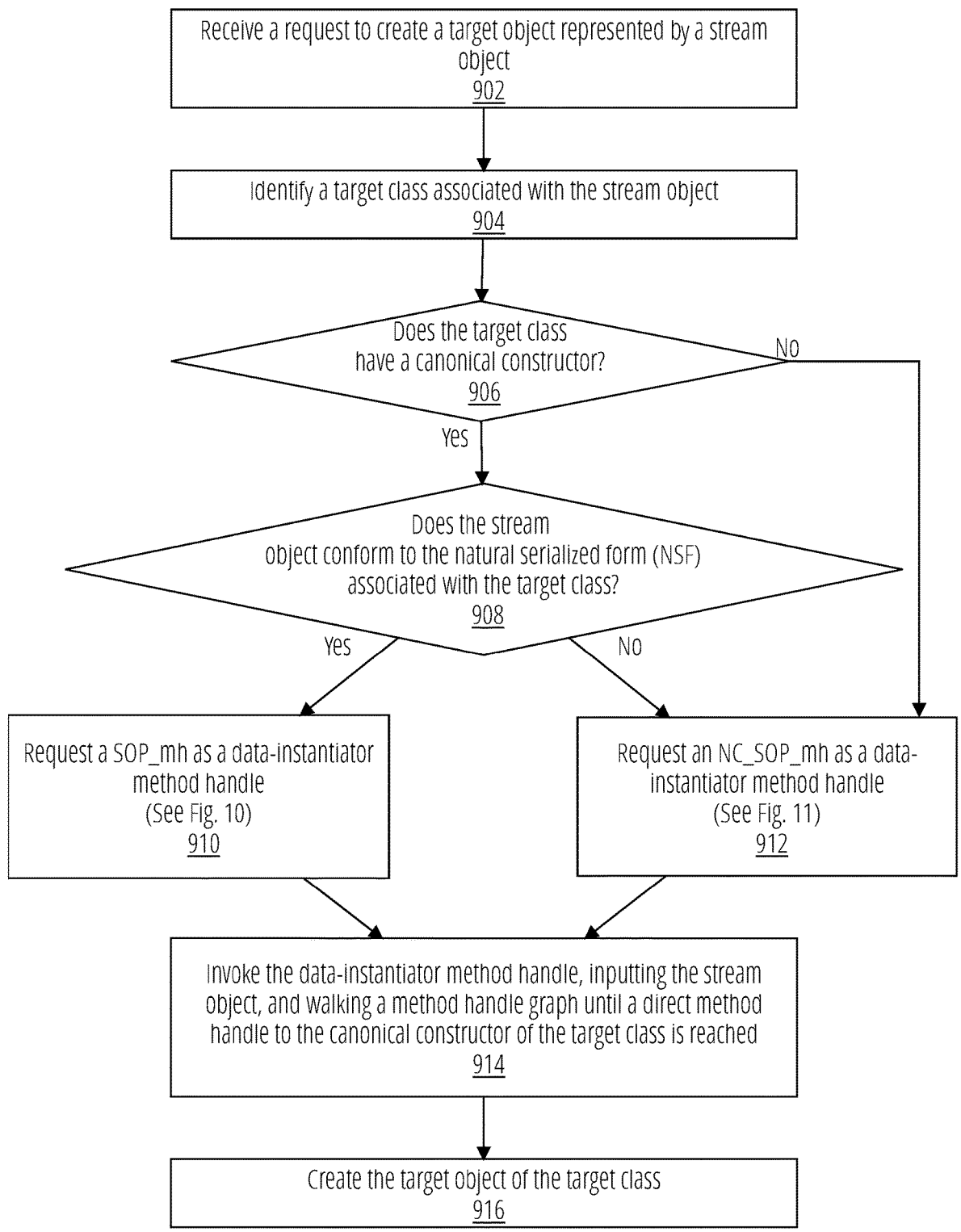
FIG. 9 illustrates an example set of operations for creating a target object in accordance with one embodiment.

FIG. 9 illustrates an example set of operations for creating a target object in accordance with one embodiment. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include receiving a request to create a target object represented by a stream object (Operation 902). A runtime environment receives a request to create a target object represented by a stream object. The request may be specified in a class file being executed by the runtime environment.

The request specifies or indicates the stream object. The stream object may include metadata and actual data. Metadata in a stream object may include information about a target class of the stream object, and/or information about ancestor classes of the target class. Actual data in a stream object may include actual data for the fields of the target class.

Additionally or alternatively, the request specifies or indicates values derived from a stream object. (In an example, the values derived from the stream object are stored as two components—a primitives component storing the actual data from the stream object for primitive fields of the target class, and a references component storing the actual data from the stream object for reference fields of the target class.)

One or more embodiments include identifying a target class associated with the stream object (Operation 904). The runtime environment determines a target class associated with the stream object as specified by metadata within the stream object. The request to create the target object based on the stream object may but does not necessarily specify the target class.

One or more embodiments include determining whether the target class has a canonical constructor (Operation 906). In an embodiment, the runtime environment determines whether the criteria is satisfied by checking the attributes of the target class. For example, since generation of a canonical constructor is triggered by a declaration of a record class during compilation, if the runtime environment determines that the target class is a record class, then the runtime environment determines that the target class has a canonical constructor. In an embodiment, the runtime environment determines whether a canonical constructor is explicitly declared for the target class. In an embodiment, the runtime environment determines identifies and compares the fields of the target class and the arguments of a constructor of the target class. If the fields of the target class and the arguments of the constructor match, and the sequence of the fields and the sequence of the arguments match, then the runtime environment determines that the target class has a canonical constructor.

One or more embodiments include determining whether the stream object (or the values derived therefrom) conforms to the natural serialized form (NSF) associated with the target class (Operation 908). The runtime environment compares the sequence of stream fields as specified in the stream object and the sequence of fields as declared in a declaration of the target class. NSF is satisfied if the sequence of stream fields matches the sequence of fields of the target class, across all fields. (If the stream object is represented by primitives component and a references component, the runtime environment compares the sequence of stream fields as specified in the primitives component and the sequence of primitive fields as declared in a declaration of the target class. The runtime environment separately compares the sequence of stream fields as specified in the references component and the sequence of reference fields as declared in a declaration of the target class. NSF is satisfied if the sequence of stream fields matches the sequence of fields of the target class, separated by field type (primitive fields and reference fields)).

In an embodiment, if the stream object does not conform with NSF, the runtime environment may generate a data structure holding data values from the stream object that do conform with NSF. The runtime environment determines a sequence in which the names of the stream fields appear in the stream object. The runtime environment matches the data for each stream field based on the position of the data within the stream object. The runtime environment reorders the data for the stream fields based on the sequence in which the corresponding fields are declared in the target class. The runtime environment generates a data structure storing the data for all stream fields, ordered based on the sequence in which the corresponding fields are declared in the target class. (Alternatively, the runtime environment generates a data structure having a primitives component and a references component. The primitives component stores the primitive data for stream fields, ordered based on the sequence in which the corresponding primitive fields are declared in the target class. The references component stores the reference data for stream fields, ordered based on the sequence in which the corresponding reference fields are declared in the target class.) The generated data structure conforming with NSF are used as the input binary data in Operations 910-914.

If a canonical constructor exists, and NSF is satisfied, one or more embodiments include requesting a SOP_mh as a data-instantiator method handle (Operation 910). A "data-instantiator method handle" of a target class refers to a method handle that accepts a data structure representing a target object (such as a stream object, a byte stream derived from a stream object, a JavaScript Object Notation (JSON) structure, an Extensible Markup Language (XML) structure, or other structured data object) and returns the target object of the target class. SOP_mh and Non-Constant Stream Object Processor method handles (NC_SOP_mh, discussed with reference to Operation 912 below) are considered data-instantiator method handles.

The runtime environment executes a method to obtain a SOP_mh from a runtime constant pool. The method may reside in a library, such as a data-instantiator meta-factory library. The following is an example request for a SOP_mh for the class Point:
MethodHandle
SOP_mh=DataInstantiatorMetaFactory.getFactoryFor (Point.class);

Examples of operations for obtaining a SOP_mh are described below with reference to FIG. 10.

Otherwise, one or more embodiments include requesting a Non-Constant Stream Object Processor method handle (NC_SOP_mh) as a data-instantiator method handle (Operation 912). The runtime environment executes a method to obtain an NC_SOP_mh. The NC_SOP_mh does not reside in a runtime constant pool. The method for obtaining the NC_SOP_mh may reside in a library. Examples of operations for obtaining an NC_SOP_mh are described below with reference to FIG. 11.

One or more embodiments include invoking the data-instantiator method handle, inputting the data structure representing the target object (such as the stream object), and walking a method handle graph until a direct method handle to the canonical constructor of the target class is reached (Operation 914).

The runtime environment identifies a request to invoke the data-instantiator method handle. The invocation request inputs the data structure representing the target object into the data-instantiator method handle. The following is an example request to invoke a SOP_mh for the class Point, inputting a primitives component and a references component representing a stream object:
var point=(Point)SOP_mh.invokeExact(primitiveData, referenceData);

In an embodiment, a data-instantiator method handle (or a pre-processing function) includes functionality to deserialize the binary data included in an inputted stream object, converting the binary data into a format associated with objects in a heap memory. The operations of the data-instantiator method handle are thereafter performed with respect to the converted data rather than the binary data.

Responsive to identifying the invocation request, the runtime environment walks through a method handle graph of the data-instantiator method handle to match each stream field to the appropriate argument of the constructor, and invoke the constructor to create the target object.

The runtime environment first processes the data-instantiator method handle itself. The data-instantiator method handle is an adapter method handle that adapts a target method handle mha. The data-instantiator method handle inserts a data value returned from an Argument Discovery method handle for the field a0 of the target class as an argument into the target mha. The Argument Discovery method handle accepts the binary data (or converted or deserialized version thereof) as an argument. Then depending on whether the data-instantiator method handle is a SOP_mh or an NC_SOP_mh, the Argument Discovery method handle "discovers" the value of the field a0, as follows.

For a SOP_mh, the Argument Discovery method handle for a0 is associated with an offset for a0 that is determined based on the NSF. The offset for a0 is a constant value for the Argument Discovery method handle for a0. The Argument Discovery method handle returns a value extracted from the binary data at the offset position.

For an NC_SOP_mh, the Argument Discovery method handle for a0 is associated with an offset for a0 that is determined based on a matching of stream fields and constructor parameters. A match is found if the names of the stream field and the constructor parameter are equal, and the types of the stream field and the constructor parameter are assignable. The Argument Discovery method handle determines the offset into the binary data for the matching stream field. The offset for a0 is a constant value for the Argument Discovery method handle for a0. The Argument Discovery method handle returns a value extracted from the binary data at the offset position. If the binary data does not contain a matching stream field, then the Argument Discovery method handle returns a default value for the type of the constructor argument (e.g. 0 for int, false for boolean, null for Object).

Then the runtime environment invokes the target mha, inserting the result from the Argument Discovery method handle into a position within an argument list of mha corresponding to a0. The runtime environment thereby matches the stream field for a0 to a constructor parameter for a0.

Within the context of invoking the intermediate method handle mha, mha is now an adapter method handle that adapts another target method handle mhb. The runtime environment continues walking through method handles of the method handle graph. Each method handle inserts an additional argument into the constructor referenced by the direct method handle of the method handle graph. The runtime environment thereby matches each stream field to an appropriate constructor parameter.

Then the runtime environment reaches a particular method handle mhc in the method handle graph. The method handle mhc is an adapter method handle that discards the binary data (or converted or deserialized version thereof) as an argument before calling a target method handle mhd. Method handle mhd is the direct method handle to the constructor of the target class.

The runtime environment invokes the target mhd, using the results previously returned from the series of Argument Discovery method handles as arguments to mhd. Since mhd is a direct method handle, the referenced constructor is invoked. The results previously returned from the series of Argument Discovery method handles are inserted as arguments to the constructor.

One or more embodiments include creating the target object of the target class (Operation 916). Based on the invocation of the constructor of the target class, the runtime environment creates the target object of the target class. The runtime environment allocates memory space within a heap memory for the target object. The runtime environment generates the target object and stores the target object in the allocated space within the heap memory.

7. Obtaining a Constant SOP_mh From a Runtime Constant Pool

Figure 10:
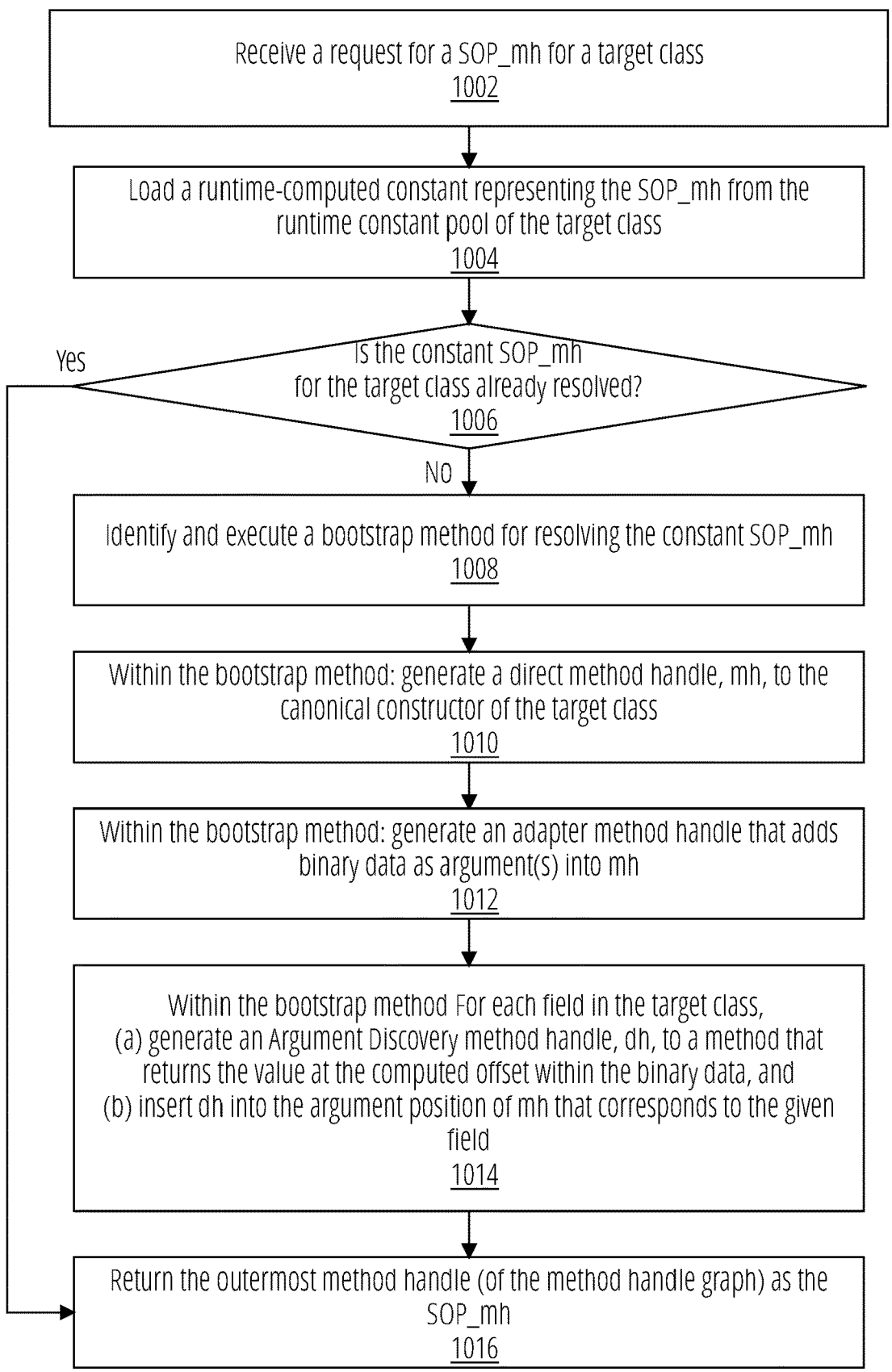
FIG. 10 illustrates an example set of operations for generating and returning a SOP_mh in accordance with one embodiment.

FIG. 10 illustrates an example set of operations for generating and returning a Stream Object Processor method handle in accordance with one embodiment. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include receiving a request for a SOP_mh for a target class (Operation 1002). A runtime environment receives a request for a SOP_mh for a target class. The request may invoke a get-SOP_mh method within a library, such as a data-instantiator meta-factory library. The request may input an object representing and/or indicating the target class into the get-SOP_mh method.

One or more embodiments include loading a runtime-computed constant representing the SOP_mh (also referred to as a "constant SOP_mh") from the runtime constant pool of the target class (Operation 1004). Various ways of loading the constant SOP_mh may be used, as follows.

In an embodiment, the get-SOP_mh method uses a modern bytecode-reading application programming interface (API) to inspect the target class's runtime constant pool. The runtime environment, executing the get-SOP_mh method, obtains a particular object representing the runtime-computed constant entry that embodies the constant SOP_mh.

In another embodiment, the target class offers an accessor method that inspects the target class's runtime constant pool and returns the SOP_mh. The accessor method when invoked for the first time triggers the resolution of the runtime-computed constant; subsequent invocations return the same method handle object. The get-SOP_mh method reflectively invokes the accessor method to load the constant SOP_mh.

One or more embodiments include determining whether the constant SOP_mh for the target class is already resolved (Operation 1006). The runtime environment determines whether the constant SOP_mh for the target class is already resolved. If the bootstrap method for the constant SOP_mh was previously invoked, then the constant SOP_mh is resolved and stored in a heap memory. The runtime environment need not generate the constant SOP_mh again. The runtime environment may reuse the constant SOP_mh to create any object of the target class.

One or more embodiments include identifying and executing a bootstrap method for resolving the constant SOP_mh (Operation 1008). The runtime environment inspects the runtime-computed constant entry, within the runtime constant pool, embodying the constant SOP_mh. The runtime environment determines an index into a bootstrap method table referenced from the runtime-computed constant entry. The runtime environment inspects the indexed entry within the bootstrap method table. The runtime environment determines a reference to a graph generation bootstrap method referenced from the indexed entry. The graph generation bootstrap method may reside in a library, such as a data-instantiator support library.

In an embodiment, the following Operations 1010-1014 are performed by the runtime environment while executing the graph generation bootstrap method.

One or more embodiments include generating a direct method handle mh to the canonical constructor of the target class (Operation 1010). The runtime environment generates a direct method handle mh to the canonical constructor of the target class. The direct method handle may be generated via a reflective API.

One or more embodiments include generating an adapter method handle mh' that adds binary data (or a converted or deserialized version thereof) as argument(s) into mh (Operation 1012). The runtime environment generates an adapter method handle mh' by applying an adapter function onto a target method handle mh. The adapter function adds binary data (or a converted or deserialized version thereof) as one or more arguments into the target mh. The following is an example instruction for generating the adapter method handle mh' that has additional argument(s):

MethodHandle mh'=dropArguments(mh, 0, primitiveDataType, referenceDataType);

In the above example, mh is a target method handle, 0 is the position of the first argument to be dropped, primitiveDataType and referenceDataType are the class types of the primitives component and the references component respectively.

One or more embodiments include, for each field of the target class, (a) generating an Argument Discovery method handle dh to a method that returns the value at a corresponding offset within the binary data, and (b) inserting dh into the argument position of mh that corresponds to the given field (Operation 1014). The runtime environment traverses through each field of the target class.

First, the runtime environment generates an Argument Discovery method handle dhn for a particular field an.

In an embodiment, the Argument Discovery method handle is a runtime-computed constant that is input as an argument into the graph generation bootstrap method. The runtime environment loads the constant Argument Discovery method handle. Operations for loading the constant Argument Discovery method handle are similar to operations for loading the constant SOP_mh described above with reference to Operations 1004-1008. The runtime environment identifies, in an entry of the bootstrap method table, (a) a discoverer generation bootstrap method, and (b) argument(s) to the discoverer generation bootstrap method. The arguments may include an offset corresponding to the particular field an within the binary data. Alternatively, the runtime environment may determine the offset within the discoverer generation bootstrap method. The offset may be determined based on the NSF, or a matching of stream fields to constructor parameters, or another method. The runtime environment executes the discoverer generation bootstrap method and returns the constant Argument Discovery method handle for the particular field an.

In another embodiment, the Argument Discovery method handle is generated within the graph generation bootstrap method. The arguments to the graph generation bootstrap method, as specified by an entry to the bootstrap method table, may include an offsets corresponding to the particular field an within the binary data. Alternatively, the runtime environment may determine the offset within the graph generation bootstrap method.

Second, the runtime environment inserts dhn into the argument position of mh that corresponds to the particular field an. The runtime environment generates an adapter method handle mh" by applying an adapter function onto a target method handle mh'. The adapter function inserts dhn into an argument position of a target method handle mh', which corresponds to the argument position of mh that corresponds to the particular field an. The following is an example instruction for generating the adapter method handle mh" that inserts an argument dhn:

MethodHandle mh"=foldArguments(mh', dhn);

Finally, the runtime environment completes traversal of all fields of the target class. The last generated adapter method handle has only the binary data as argument(s), and does not include any fields of the target class as an argument.

One or more embodiments include returning the outermost method handle (of the method handle graph) as the SOP_mh (Operation 1016). The runtime environment returns the outermost method handle of the method handle graph as the SOP_mh. The SOP_mh is thus adapted, indirectly, from the direct method handle to the canonical constructor of the target class.

In an embodiment, a dynamic compiler of the runtime environment recognizes the SOP_mh as a constant that is optimizable. The dynamic compiler hence performs constant-folding and/or inlining on the SOP_mh.

8. Obtaining a Non-Constant Stream Object Processor Method Handle (NC_SOP_mh)

Figure 11:
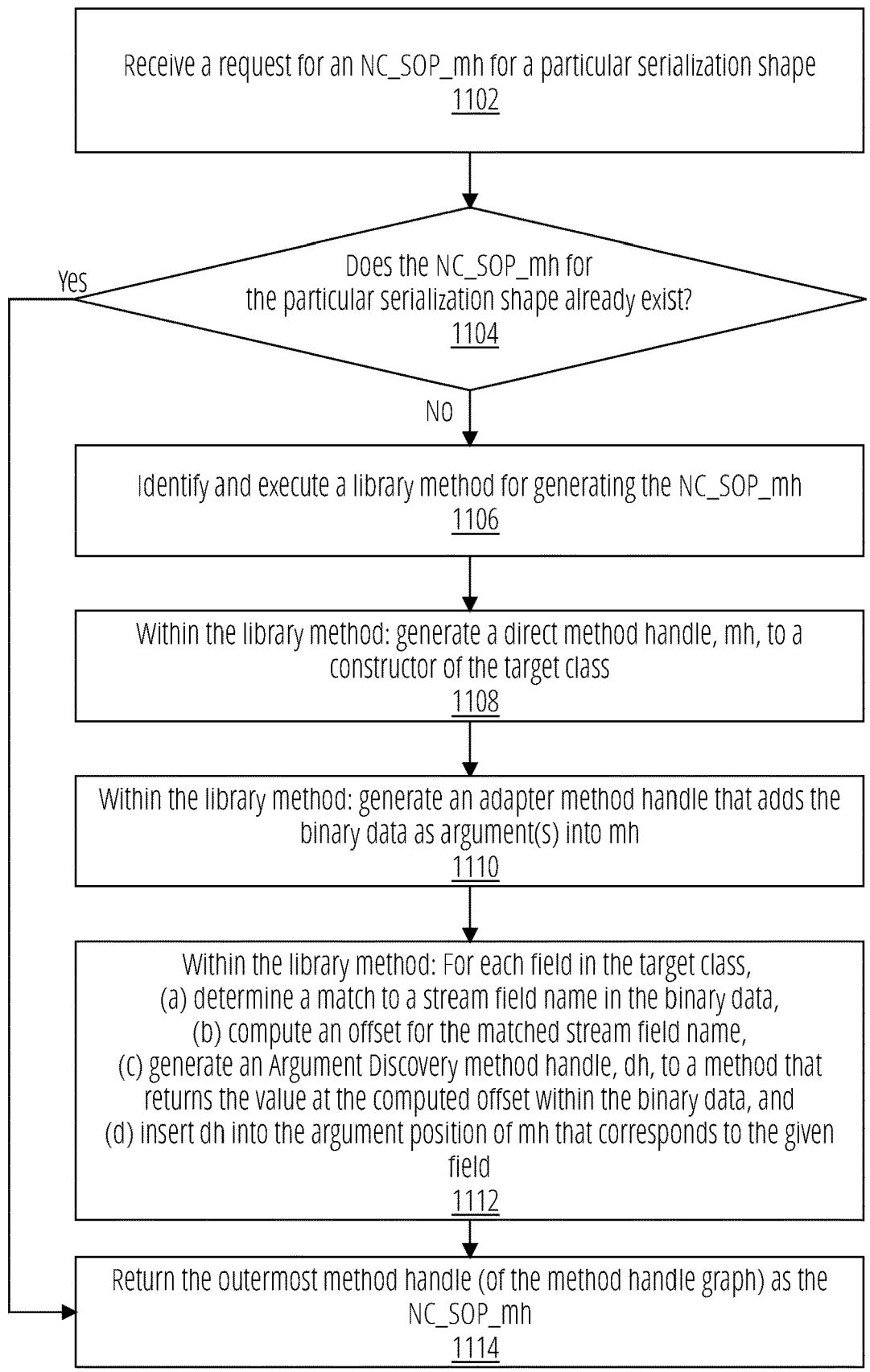
FIG. 11 illustrates an example set of operations for generating and returning an NC_SOP_mh in accordance with one embodiment.

FIG. 11 illustrates an example set of operations for generating and returning an NC_SOP_mh in accordance with one embodiment. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include receiving a request for an NC_SOP_mh for a particular serialization shape (Operation 1102). A runtime environment receives a request for an NC_SOP_mh for a particular serialization shape. A "serialization shape" refers to the fields and the sequence of the fields as specified in a stream object (or one or more byte streams extracted from a stream object). The request may specify an object representing and/or indicating the particular serialization shape.

One or more embodiments include determining whether the NC_SOP_mh for the particular serialization shape already exists (Operation 1104). The runtime environment determines whether the NC_SOP_mh for the particular serialization shape was previously generated and/or already exists. The runtime environment may inspect whether a heap memory stores the NC_SOP_mh for the particular serialization shape. If the NC_SOP_mh for the particular serialization shape was previously generated and is stored in a heap memory, the runtime environment need not generate the NC_SOP_mh again. The runtime environment may reuse the NC_SOP_mh to create any object based on a stream object of the particular serialization shape.

One or more embodiments include identifying and executing a library method for generating the NC_SOP_mh (Operation 1106). The runtime environment identifies a request to execute a method for generating the NC_SOP_mh. The method may reside in a library. The NC_SOP_mh is not a constant within a runtime constant pool.

In an embodiment, the following Operations 1108-1112 are performed by the runtime environment while executing the library method.

One or more embodiments include generating a direct method handle mh to a constructor of the target class (Operation 1108). The runtime environment identifies a constructor of the target class, which may be but is not necessarily a canonical constructor. Examples of operations for generating a direct method handle mh to a constructor of the target class are described above with reference to Operation 1010 of FIG. 10.

One or more embodiments include generating an adapter method handle mh' that adds binary data as argument(s) into mh (Operation 1110). Examples of operations for generating an adapter method handle mh' that adds binary data as argument(s) into mh are described above with reference to Operation 1012 of FIG. 10.

One or more embodiments include, for each field of the target class, (a) determining a match to a stream field name in the binary data, (b) computing an offset for the matched stream field name, (c) generating an Argument Discovery method handle dh to a method that returns the value at the computed offset within the binary data, and (d) inserting dh into the argument position of mh that corresponds to the given field (Operation 1112).

First, the runtime environment compares the stream fields with a particular field an of the target class. The runtime environment determines a match between a stream field and the particular field an if the names of the stream field and the particular field an are same and the types of the stream field and the particular field an are assignable.

Second, the runtime environment computes an offset for the matched stream field. The runtime environment determines a sequence of stream fields as specified by the binary data. The runtime environment determines a position of the matched stream field within the sequence of stream fields. The runtime environment determines memory sizes of each stream field preceding the matched stream field in the sequence of stream fields. The runtime environment determines that the offset for the matched stream field is the sum of the initial offset corresponding to a start of the binary data (which is typically 0) and the memory sizes of each stream field preceding the matched stream field in the sequence of stream fields.

Third, the runtime environment generates an Argument Discovery method handle dhn to a method that returns the value at the computed offset within the binary data. The Argument Discovery method handle is not a constant within the runtime constant pool.

Fourth, the runtime environment inserts dhn into the argument position of mh that corresponds to the particular field an. Examples of operations for inserting an Argument Discovery method handle are described above with reference to Operation 1014 of FIG. 10.

Finally, the runtime environment completes traversal of all fields of the target class. The last generated adapter method handle has only the binary data as argument(s), and does not include any fields of the target class as an argument.

One or more embodiments include returning the outermost method handle (of the method handle graph) as the NC_SOP_mh (Operation 1114). The runtime environment returns the outermost method handle of the method handle graph as the NC_SOP_mh. The NC_SOP_mh is thus adapted, indirectly, from the direct method handle to a constructor of the target class.

In an embodiment, a dynamic compiler of the runtime environment does not recognize the NC_SOP_mh as a constant. The dynamic compiler does not recognize the NC_SOP_mh as a candidate for optimization.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
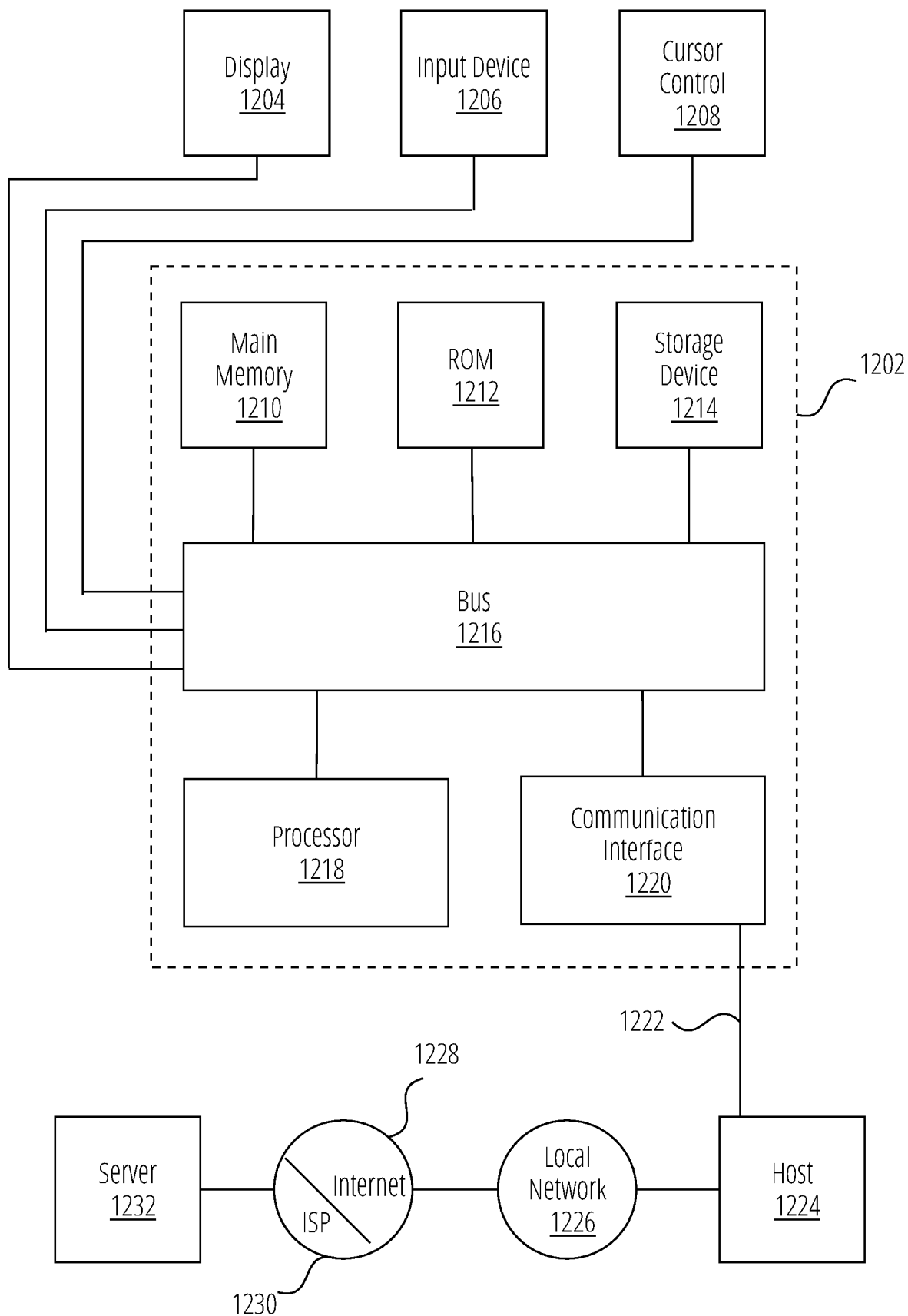
FIG. 12 is a block diagram illustrating a system in accordance with one embodiment.

For example, FIG. 12 is a block diagram that illustrates a computer system 1202 upon which an embodiment of the invention may be implemented. Computer system 1202 includes a bus 1216 or other communication mechanism for communicating information, and a hardware processor 1218 coupled with bus 1216 for processing information. Hardware processor 1218 may be, for example, a general purpose microprocessor.

Computer system 1202 also includes a main memory 1210, such as a random access memory (RAM) or other dynamic storage device, coupled to bus 1216 for storing information and instructions to be executed by processor 1218. Main memory 1210 also may be used for storing temporary variables or other intermediate information during execution of instructions to be executed by processor 1218. Such instructions, when stored in non-transitory storage media accessible to processor 1218, render computer system 1202 into a special-purpose machine that is customized to perform the operations specified in the instructions.

Computer system 1202 further includes a read only memory ROM 1212 or other static storage device coupled to bus 1216 for storing static information and instructions for processor 1218. A storage device 1214, such as a magnetic disk or optical disk, is provided and coupled to bus 1216 for storing information and instructions.

Computer system 1202 may be coupled via bus 1216 to a display 1204, such as a cathode ray tube (CRT), for displaying information to a computer user. An input device 1206, including alphanumeric and other keys, is coupled to bus 1216 for communicating information and command selections to processor 1218. Another type of user input device is cursor control 1208, such as a mouse, a trackball, or cursor direction keys for communicating direction information and command selections to processor 1218 and for controlling cursor movement on display 1204. This input device typically has two degrees of freedom in two axes, a first axis (e.g., x) and a second axis (e.g., y), that allows the device to specify positions in a plane.

Computer system 1202 may implement the techniques described herein using customized hard-wired logic, one or more ASICs or FPGAs, firmware and/or program logic which in combination with the computer system causes or programs computer system 1202 to be a special-purpose machine. According to one embodiment, the techniques herein are performed by computer system 1202 in response to processor 1218 executing one or more sequences of one or more instructions contained in main memory 1210. Such instructions may be read into main memory 1210 from another storage medium, such as storage device 1214. Execution of the sequences of instructions contained in main memory 1210 causes processor 1218 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1214. Volatile media includes dynamic memory, such as main memory 1210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1216. Transmission media can also take the form of acoustic or light waves, such as those generated during radio-wave and infra-red data communications.

Various forms of media may be involved in carrying one or more sequences of one or more instructions to processor 1218 for execution. For example, the instructions may initially be carried on a magnetic disk or solid state drive of a remote computer. The remote computer can load the instructions into its dynamic memory and send the instructions over a telephone line using a modem. A modem local to computer system 1202 can receive the data on the telephone line and use an infra-red transmitter to convert the data to an infra-red signal. An infra-red detector can receive the data carried in the infra-red signal and appropriate circuitry can place the data on bus 1216. Bus 1216 carries the data to main memory 1210, from which processor 1218 retrieves and executes the instructions. The instructions received by main memory 1210 may optionally be stored on storage device 1214 either before or after execution by processor 1218.

Computer system 1202 also includes a communication interface 1220 coupled to bus 1216. Communication interface 1220 provides a two-way data communication coupling to a network link 1222 that is connected to a local network 1226. For example, communication interface 1220 may be an integrated services digital network (ISDN) card, cable modem, satellite modem, or a modem to provide a data communication connection to a corresponding type of telephone line. As another example, communication interface 1220 may be a local area network (LAN) card to provide a data communication connection to a compatible LAN. Wireless links may also be implemented. In any such implementation, communication interface 1220 sends and receives electrical, electromagnetic or optical signals that carry digital data streams representing various types of information.

Network link 1222 typically provides data communication through one or more networks to other data devices. For example, network link 1222 may provide a connection through local network 1226 to a host computer 1224 or to data equipment operated by an Internet Service Provider ISP 1230. ISP 1230 in turn provides data communication services through the world wide packet data communication network now commonly referred to as the Internet 1228. Local network 1226 and Internet 1228 both use electrical, electromagnetic or optical signals that carry digital data streams. The signals through the various networks and the signals on network link 1222 and through communication interface 1220, which carry the digital data to and from computer system 1202, are example forms of transmission media.

Computer system 1202 can send messages and receive data, including program code, through the network(s), network link 1222 and communication interface 1220. In the Internet example, a server 1232 might transmit a requested code for an application program through Internet 1228, ISP 1230, local network 1226 and communication interface 1220.

The received code may be executed by processor 1218 as it is received, and/or stored in storage device 1214, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:
    receiving a request to create a target object based on a stream object, wherein the stream object is associated with a target class;
    accessing a runtime constant pool associated with the target class to obtain a first method handle of a set of method handles;
    wherein the first method handle is adapted, directly or indirectly, from a second method handle of the set of method handles that references a constructor of the target class;
    invoking the first method handle using data obtained from the stream object;
    creating the target object of the target class.

2. The media of claim 1, wherein invoking the first method handle using the data obtained from the stream object thereby invokes the constructor of the target class.

3. The media of claim 1, further storing instructions comprising:
    identifying a first entry, within the runtime constant pool, corresponding to the first method handle;
    identifying a first bootstrap method based on the first entry;
    executing the first bootstrap method to generate the first method handle.

4. The media of claim 3, wherein executing the first bootstrap method is responsive at least to determining that the first method handle is not yet been determined.

5. The media of claim 3, further storing instructions comprising:
    identifying a first set of one or more arguments to the first bootstrap method specified by the first entry, wherein the first set of one or more arguments comprises information identifying the target class.

6. The media of claim 3, further storing instructions comprising:
    identifying a first set of one or more arguments to the first bootstrap method specified by the first entry, wherein the first set of one or more arguments comprises a first Argument Discovery method handle;
    identifying a second entry, within the runtime constant pool, corresponding to the first Argument Discovery method handle;
    identifying a second bootstrap method based on the second entry;
    executing the second bootstrap method to generate the first Argument Discovery method handle.

7. The media of claim 6, further storing instructions comprising:
    identifying a second set of one or more arguments to the second bootstrap method specified by the second entry, wherein the second set of one or more arguments comprises a constant representing an offset within the data obtained from the stream object corresponding to a value for a field of a set of fields of the target class, and the offset is determined based at least on a sequence in which the set of fields are declared in a declaration of the target class.

8. The media of claim 3, further storing instructions comprising:
identifying a first set of one or more arguments to the first bootstrap method specified by the first entry, wherein the first set of one or more arguments comprises a constant representing an offset within the data obtained from the stream object corresponding to a value for a field of a set of fields of the target class, and the offset is determined based at least on a sequence in which the set of fields are declared in a declaration of the target class.

9. The media of claim 1, wherein a set of parameters for the constructor matches a set of fields of the target class, and a first sequence of the set of parameters matches a second sequence in which the set of fields are declared in a declaration of the target class.

10. The media of claim 1, further storing instructions comprising:
generating the second method handle;
adapting the second method handle to generate a third method handle, of the set of method handles;
adapting a fourth method handle, of the set of method handles, to generate the first method handle.

11. The media of claim 1, further storing instructions which cause:
responsive to invoking the first method handle:
determining that the first method handle is adapted from a third method handle, of the set of method handles;
determining that a fourth method handle, of the set of method handles, is adapted from a second method handle;
determining that the second method handle references the constructor associated with the target class.

12. The media of claim 1, wherein each of the set of method handles, other than the second method handle, is adapted from at least one other method handle of the set of method handles.

13. The media of claim 1, further storing instructions which cause:
responsive to invoking the first method handle:
invoking a first Argument Discovery method handle to determine a value for a field of the target class based on the data obtained from the stream object;
invoking the second method handle with the value inserted as an argument to the second method handle.

14. The media of claim 1, wherein the first method handle is a runtime-computed constant in the runtime constant pool.

15. The media of claim 1, wherein the first method handle is computed lazily responsive to a request to access the first method handle.

16. The media of claim 1, wherein a dynamic compiler recognizes the first method handle as a constant that is optimizable.

17. The media of claim 1, wherein a dynamic compiler performs at least one of inlining and constant folding for the first method handle and one or more of the set of method handles.

18. The media of claim 1, wherein creating the target object comprises storing a data structure representing the target object into a heap memory.

19. The media of claim 1, further storing instructions which cause:
determining whether a first sequence of a set of one or more arguments for the constructor matches a second sequence in which a set of one or more fields are declared in a declaration of the target class;
wherein accessing the runtime constant pool associated with the target class to obtain the first method handle of the set of method handles is responsive to determining that the first sequence matches the second sequence.

20. The media of claim 1, further storing instructions which cause:
determining whether the data obtained from the stream object conforms with a natural serialized form associated with the target class;
wherein accessing the runtime constant pool associated with the target class to obtain the first method handle of the set of method handles is responsive to determining that the data obtained from the stream object conforms with the natural serialized form associated with the target class.

21. A method, comprising:
receiving a request to create a target object based on a stream object, wherein the stream object is associated with a target class;
accessing a runtime constant pool associated with the target class to obtain a first method handle of a set of method handles;
wherein the first method handle is adapted, directly or indirectly, from a second method handle of the set of method handles that references a constructor of the target class;
invoking the first method handle using data obtained from the stream object;
creating the target object of the target class;
wherein the method is executed by one or more devices, each including one or more hardware processors.

* * * * *